US011518390B2

(12) United States Patent  
Fujiyoshi et al.

(10) Patent No.: US 11,518,390 B2  
(45) Date of Patent: Dec. 6, 2022

(54) ROAD SURFACE DETECTION APPARATUS, IMAGE DISPLAY APPARATUS USING ROAD SURFACE DETECTION APPARATUS, OBSTACLE DETECTION APPARATUS USING ROAD SURFACE DETECTION APPARATUS, ROAD SURFACE DETECTION METHOD, IMAGE DISPLAY METHOD USING ROAD SURFACE DETECTION METHOD, AND OBSTACLE DETECTION METHOD USING ROAD SURFACE DETECTION METHOD

(71) Applicant: Mitsubishi Electric Corporation, Tokyo (JP)

(72) Inventors: Hiroki Fujiyoshi, Tokyo (JP); Kohei Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 16/971,350

(22) PCT Filed: Apr. 16, 2018

(86) PCT No.: PCT/JP2018/015663  
§ 371 (c)(1),  
(2) Date: Aug. 20, 2020

(87) PCT Pub. No.: WO2019/202628  
PCT Pub. Date: Oct. 24, 2019

(65) Prior Publication Data  
US 2020/0391751 A1  Dec. 17, 2020

(51) Int. Cl.  
*B60W 40/06* (2012.01)  
*B60W 50/14* (2020.01)

(52) U.S. Cl.  
CPC ............ *B60W 40/06* (2013.01); *B60W 50/14* (2013.01); *B60W 2050/146* (2013.01);  
(Continued)

(58) Field of Classification Search  
CPC ....... B60W 2420/403; B60W 2556/00; B60W 50/14; B60W 2554/4041;  
(Continued)

(56) References Cited

U.S. PATENT DOCUMENTS 11,054,538 B1 * 7/2021 MacVittie ............... G01C 15/02  
2010/0208071 A1 * 8/2010 Takahashi ................ G08G 1/04  
348/148  
(Continued)

FOREIGN PATENT DOCUMENTS

CA  3066752 A1 * 7/2020 ............. E01C 23/01  
CN  107472135 A * 12/2017 ............... B60R 1/00  
(Continued)

*Primary Examiner* — Atul Trivedi  
(74) *Attorney, Agent, or Firm* — Sughrue Mion, PLLC; Richard C. Turner

(57) ABSTRACT

A histogram is calculated based on a road surface image of a portion around a vehicle, and the histogram is separated into a histogram that represents an in-sunlight road surface and includes a first peak value and a histogram that represents a shadow road surface and includes a second peak value to output the histograms, thereby further enhancing the accuracy of road surface detection around the vehicle as compared with conventional art.

15 Claims, 21 Drawing Sheets

(52) U.S. Cl.
CPC ... *B60W 2400/00* (2013.01); *B60W 2420/403* (2013.01); *B60W 2554/4041* (2020.02); *B60W 2556/00* (2020.02)

(58) Field of Classification Search
CPC .......... B60W 2050/146; B60W 40/06; B60W 2400/00; G06T 2207/30252; G06T 7/11; G06T 7/136; G06V 20/58; G06V 10/50
USPC .......................................................... 701/1
See application file for complete search history.

(56) References Cited

U.S. PATENT DOCUMENTS

| | | | | |
|---|---|---|---|---|
| 2012/0128211 A1* | 5/2012 | Ichikawa | ............... | G06V 20/58 382/103 |
| 2013/0155061 A1* | 6/2013 | Jahanshahi | ........... | G06T 7/0004 345/419 |
| 2013/0229513 A1* | 9/2013 | Ichitani | .............. | G02B 27/1066 348/135 |
| 2018/0238820 A1* | 8/2018 | Ghods | ................. | G01M 5/0083 |
| 2019/0154442 A1* | 5/2019 | Annovi | ................ | H04N 13/254 |
| 2020/0124430 A1* | 4/2020 | Bradlow | .............. | B62K 15/006 |
| 2020/0371217 A1* | 11/2020 | Namba | ................. | G01S 17/931 |

FOREIGN PATENT DOCUMENTS

| | | | | |
|---|---|---|---|---|
| DE | 102021103777 A1 * | 8/2021 | .......... | G05D 1/0253 |
| JP | 2017-033506 A | 2/2017 | | |
| WO | WO-2019202628 A1 * | 10/2019 | ........... | B60W 40/06 |

* cited by examiner

ROAD SURFACE DETECTION APPARATUS, IMAGE DISPLAY APPARATUS USING ROAD SURFACE DETECTION APPARATUS, OBSTACLE DETECTION APPARATUS USING ROAD SURFACE DETECTION APPARATUS, ROAD SURFACE DETECTION METHOD, IMAGE DISPLAY METHOD USING ROAD SURFACE DETECTION METHOD, AND OBSTACLE DETECTION METHOD USING ROAD SURFACE DETECTION METHOD

CROSS REFERENCE TO RELATED APPLICATIONS

This application is a National Stage of International Application No. PCT/JP2018/015663 filed Apr. 16, 2018.

TECHNICAL FIELD

The present disclosure relates to a road surface detection apparatus, an image display apparatus using the road surface detection apparatus, an obstacle detection apparatus using the road surface detection apparatus, a road surface detection method, an image display method using the road surface detection method, and an obstacle detection method using the road surface detection method.

BACKGROUND ART

In recent years, a preventive safety system, for automobiles, for detecting an obstacle around a vehicle with the use of an imaging device to, for example, prevent vehicle collision, perform automatic parking, or control a distance between vehicles has been suggested. A road surface detection apparatus in such a system has a problem that a pattern on a road surface, a shadow on a road surface, or the like is erroneously detected as an obstacle As conventional art for solving the problem, Patent Document 1 discloses a road surface detection apparatus.

CITATION LIST

Patent Document

Patent Document 1: Japanese Laid-Open Patent Publication No. 2017-33506

SUMMARY OF THE INVENTION

Problems to be Solved by the Invention

In the road surface detection apparatus disclosed in Patent Document 1, a brightness value of a road surface is estimated based on a brightness value histogram generated from a histogram generation region. In a case where the histogram generation region is covered with a shadow of a vehicle or a structural object, or an obstacle, brightness information of a road surface in sunlight cannot be obtained, so that the road surface cannot be correctly detected. In a case where a shadow is not in the histogram generation region, a road surface that includes a shadow cannot be detected, and a shadow of an obstacle on a road surface may be erroneously detected as an obstacle. Therefore, the road surface detection apparatus disclosed in Patent Document 1 has a problem that the accuracy of road surface detection may be reduced due to a shadow.

The present disclosure has been made in order to solve the aforementioned problem, and an object of the present disclosure is to further enhance the accuracy of road surface detection around a vehicle as compared with conventional art.

Solution to the Problems

A road surface detection apparatus according to the present disclosure includes:

an imaging unit disposed in a vehicle for obtaining a road surface image of a portion around the vehicle, and outputting a plurality of partial road surface images each of which represents a part of the road surface image;

a histogram generation region extraction unit for receiving input of the plurality of partial road surface images, and extracting a predetermined region of the partial road surface images as a plurality of histogram generation regions;

a histogram generation region combining unit for combining the plurality of histogram generation regions and outputting the combined region as a histogram generation composite region;

a histogram calculation unit for calculating a histogram based on the histogram generation composite region;

a histogram separation unit for separating the histogram into a first histogram and a second histogram and outputting the first and the second histograms;

a first region extraction unit for extracting a first region from the first histogram and the partial road surface images; and a second region extraction unit for extracting a second region from the second histogram and the partial road surface images, and, in the road surface detection apparatus, the histogram separation unit separates the histogram such that an element including a first peak value is the first histogram, and an element including a second peak value is the second histogram.

Effect of the Invention

The road surface detection apparatus according to the present disclosure detects a shadow on a road surface around a vehicle, thereby further enhancing the accuracy of road surface detection as compared with a conventional road surface detection apparatus.

DESCRIPTION OF EMBODIMENTS

Figure 1A:
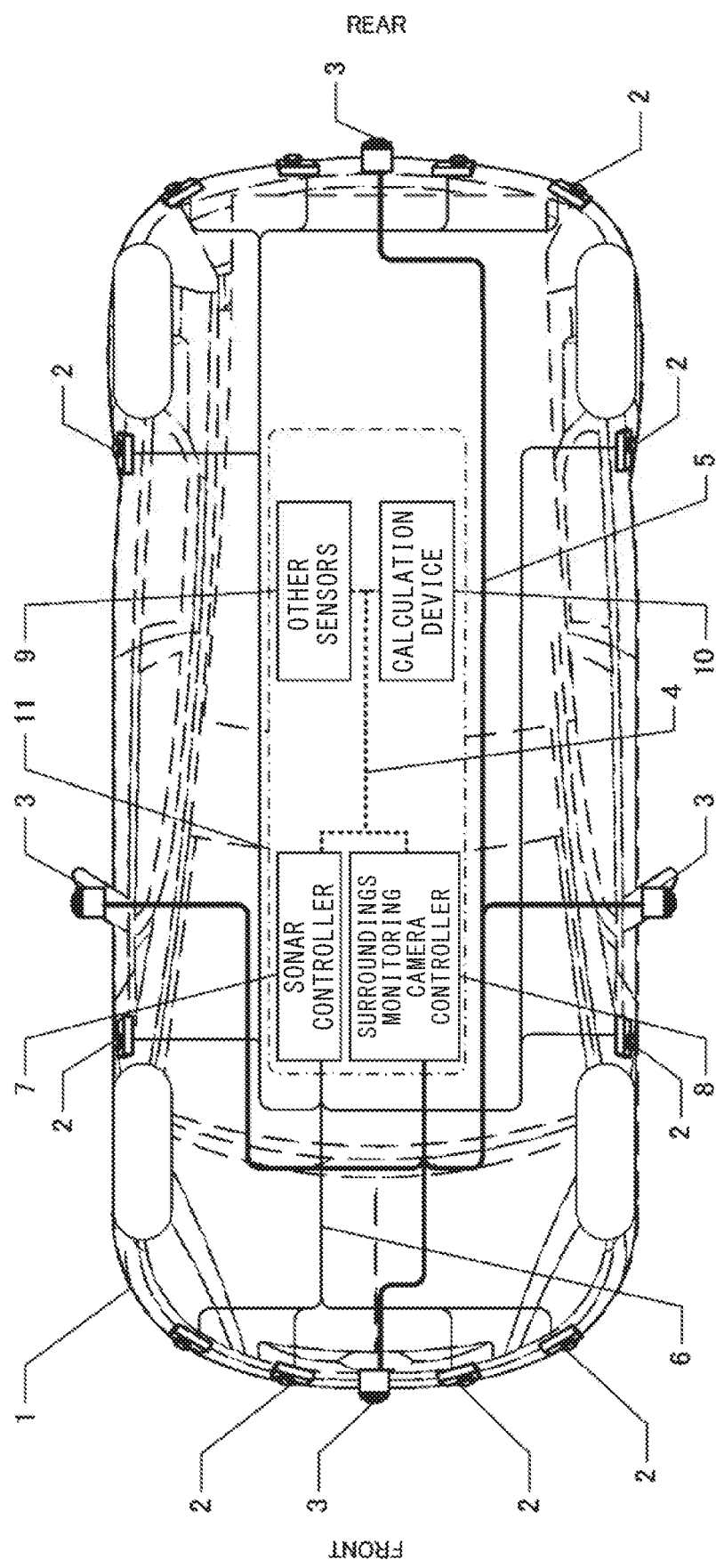
FIG. 1A is a schematic diagram illustrating a configuration of a road surface detection apparatus according to embodiment 1.

A road surface detection apparatus of the present disclosure will be described below for its configuration and operation according to preferred embodiments with reference to the accompanying drawings. In description for the drawings, the same reference character denotes the same or equivalent component, and repeated description of the same component is omitted.

Embodiment 1

A road surface detection apparatus of embodiment 1 detects an in-sunlight road surface that is a road surface in sunshine, and a shadow road surface that is a road surface that includes a shadow, by performing image processing of an image of a portion around a vehicle 1 for enhancing the accuracy of road surface detection in order to solve the problem of conventional art. A schematic configuration of the road surface detection apparatus of embodiment 1 will be described with reference to FIG. 1A.

In FIG. 1A, the vehicle 1 has sonar sensors 2, cameras 3, and a road surface detection device 11. A plurality of sonar sensors 2 are disposed at the front portion, side portions, and the rear portion of the vehicle, and are connected to a sonar controller 7 via sonar sensor wiring 6. In FIG. 1A, four sonar sensors 2 are disposed at each of the front and rear portions, and two sonar sensors 2 are disposed at each of the side portions. However, the number of the sonar sensors 2 disposed at each of the front and rear portions may be two to three depending on the size of the vehicle 1 in a case where a necessary measurement region can be obtained.

A plurality of the cameras 3 are disposed at the front, the rear, the left, and the right portions of the vehicle 1, and are connected to a surroundings monitoring camera controller 8 via camera wiring 5. In FIG. 1A, the left and right cameras are each mounted below a door mirror, which is a typical mounting portion at present, and the front and rear cameras are each disposed at the center of a bumper. However, the cameras may not necessarily be mounted as shown in FIG. 1A. The cameras can be each mounted at any position as long as the object of the present disclosure is achieved.

The road surface detection device 11 includes other sensors 9 and a calculation device 10 as well as the sonar controller 7 and the surroundings monitoring camera controller 8. These components are connected to each other by a communication line 4 (for example, CAN: control area network, or the like).

Figure 1B:
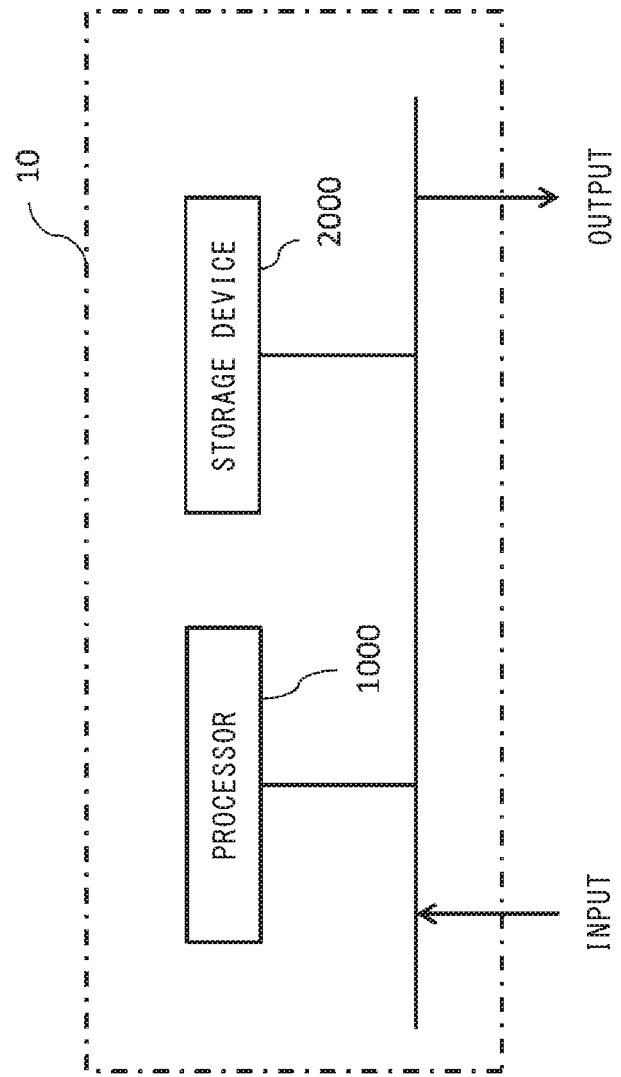
FIG. 1B illustrates a hardware configuration of a calculation device according to embodiment 1.

The calculation device 10 includes a processor 1000 and a storage device 2000, as shown in FIG. 1B. The storage device includes a volatile storage device such as a random access memory, and a non-volatile auxiliary storage device such as a flash memory, which are not shown. Instead of the flash memory, an auxiliary storage device as a hard disk may be provided. The processor 1000 executes a program inputted from the storage device 2000, to implement the configuration for a functional block illustrated in FIG. 2 and perform a part or the entirety of the operation in a flow chart shown in FIG. 3. In this case, the program is inputted to the processor 1000 from the auxiliary storage device through the volatile storage device. Furthermore, the processor 1000 may output data such as input and output signals, an intermediate value of calculation, and the calculation result, to the volatile storage device of the storage device 2000, or may store the data in the auxiliary storage device through the volatile storage device. In addition to the processor 1000 and the storage device 2000, a logic circuit and an analog circuit may also be used in combination. The calculation device 10 implements the functional block and performs a part or the entirety of the operation in a flow chart as described below in each of embodiment 2 and embodiment 3.

Figure 2:
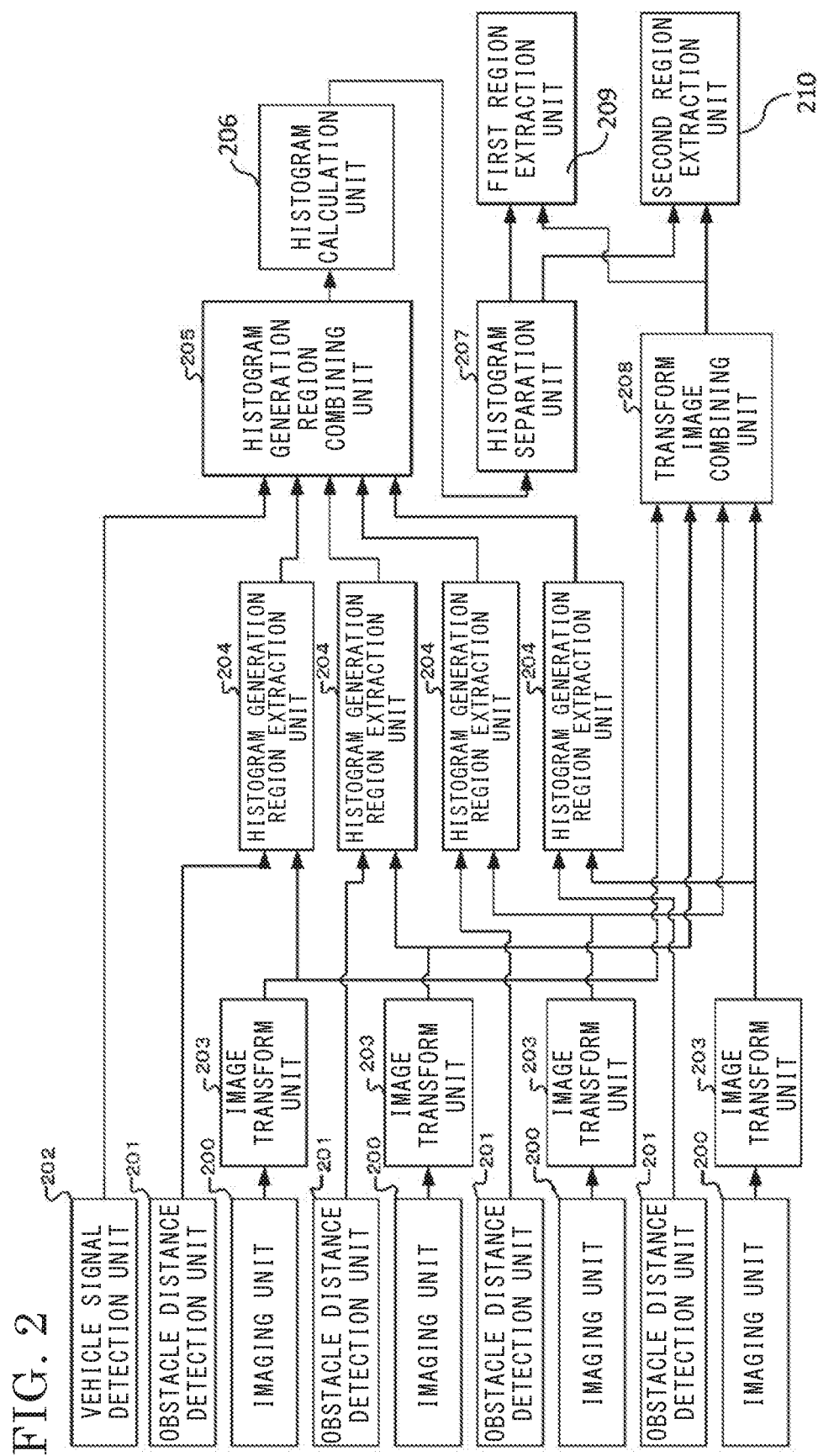
FIG. 2 is a functional block diagram illustrating the road surface detection apparatus according to embodiment 1.

FIG. 2 is a functional block diagram illustrating a functional configuration of the road surface detection device 11 according to embodiment 1.

The road surface detection device 11 includes an imaging unit 200, an obstacle distance detection unit 201, a vehicle signal detection unit 202, an image transform unit 203, a histogram generation region extraction unit 204, a histogram generation region combining unit 205, a histogram calculation unit 206, a histogram separation unit 207, a transform image combining unit 208, a first region extraction unit 209, and a second region extraction unit 210.

The imaging unit 200 includes a plurality of the cameras 3, the surroundings monitoring camera controller 8, and the camera wiring 5 connecting therebetween, as shown in FIG. 1A.

The obstacle distance detection unit 201 detects an obstacle around the vehicle 1, and detects an obstacle distance between the obstacle and the obstacle distance detection unit 201. As a device for detecting the obstacle distance, for example, a sonar sensor, an infrared depth sensor, a millimeter wave radar, or a LiDAR technique may be used. The obstacle distance detection unit 201 includes a plurality of the sonar sensors 2, the sonar controller 7, and the sonar sensor wiring 6 connecting therebetween, as shown in FIG. 1A.

The vehicle signal detection unit 202 corresponds to the other sensors 9 in FIG. 1A, and detects a vehicle state. The vehicle signal detection unit 202 detects a vehicle signal indicating a vehicle speed, a steering wheel angle, shift information, brake information, a yaw rate, or the like.

In the functional block diagram shown in FIG. 2, the image transform unit 203, the histogram generation region extraction unit 204, the histogram generation region combining unit 205, the histogram calculation unit 206, the histogram separation unit 207, the transform image combining unit 208, the first region extraction unit 209, and the second region extraction unit 210 are included in the calculation device 10 shown in FIG. 1. The operation of the functional block of the calculation device 10 will be described with reference to the flow chart shown in FIG. 3.

Figure 3:
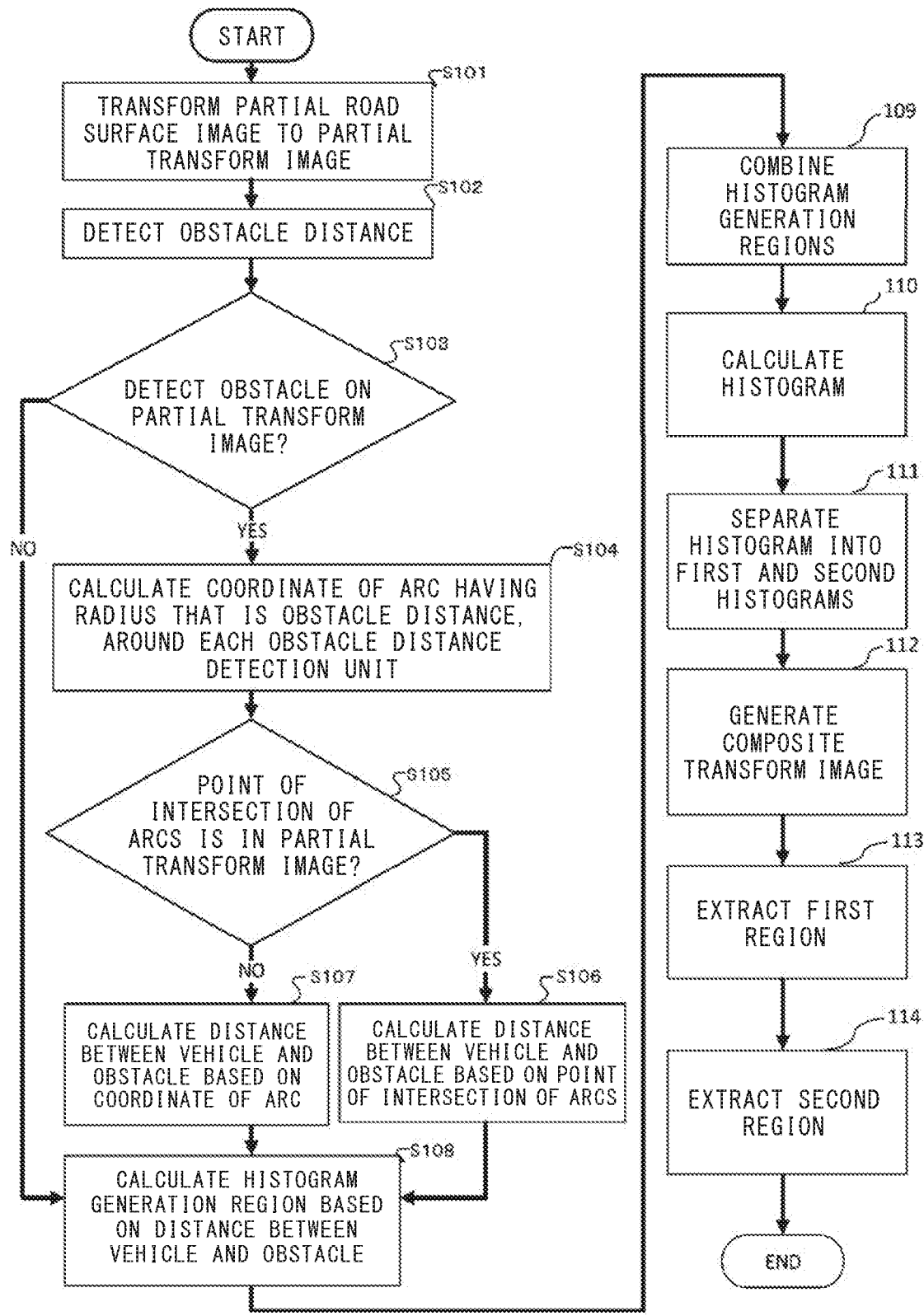
FIG. 3 is a flow chart showing an operation of the road surface detection apparatus according to embodiment 1.

In FIG. 3, in step S101, the image transform unit 203 shown in FIG. 2 performs image processing of a partial road surface image taken by the imaging unit 200 to perform transformation to a partial transform image. In embodiment 1, as shown in FIG. 1A, through projective transformation of partial road surface images taken by the four cameras 3 for taking images from the four portions of the vehicle 1, transformation to partial transform images is performed.

Figure 4:
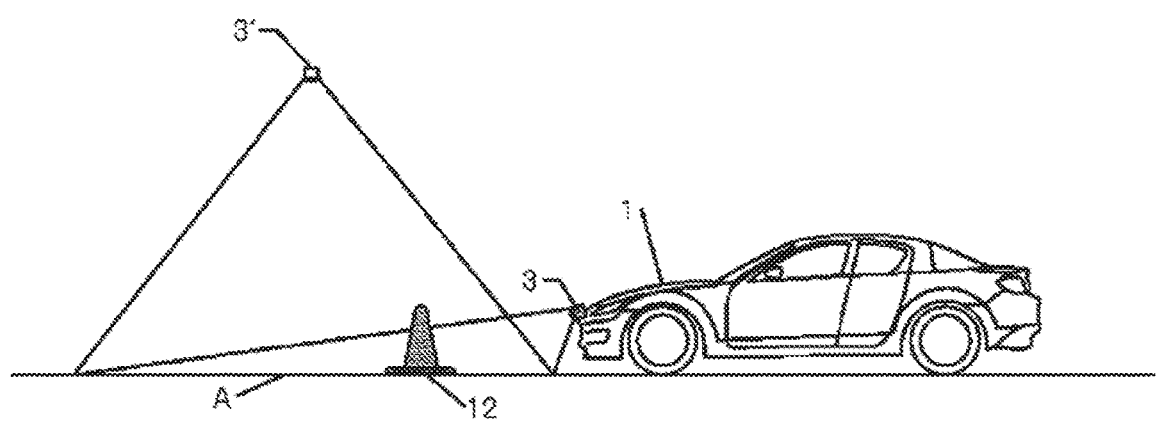
FIG. 4 illustrates a relationship between a front camera 3, a range of a partial road surface image, and a virtual camera 3' used for taking a partial transform image, in the road surface detection apparatus according to embodiment 1.

The projective transformation will be described with reference to FIG. 4 to FIG. 6. FIG. 4 illustrates the vehicle 1, the camera 3 mounted at the front portion of the vehicle 1, and a range of the partial road surface image taken at the position of the camera 3. Furthermore, FIG. 4 illustrates a relationship between a range of the partial transform image obtained by the projective transformation of the partial road surface image, and a virtual camera 3' for taking the partial transform image.

Figure 5:
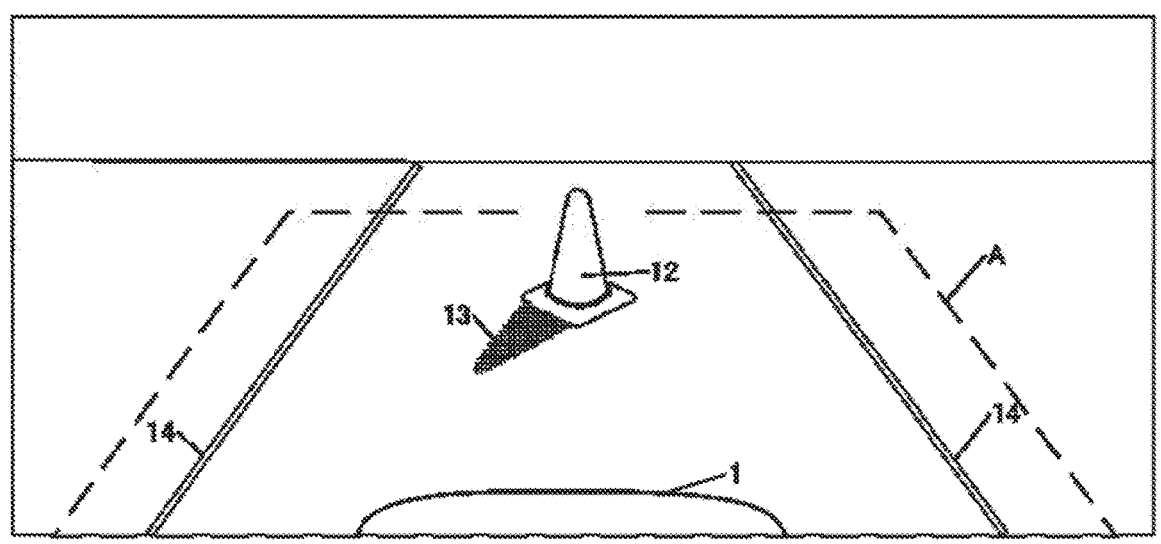
FIG. 5 illustrates a partial road surface image obtained from the camera 3 in the road surface detection apparatus according to embodiment 1.
Figure 6:
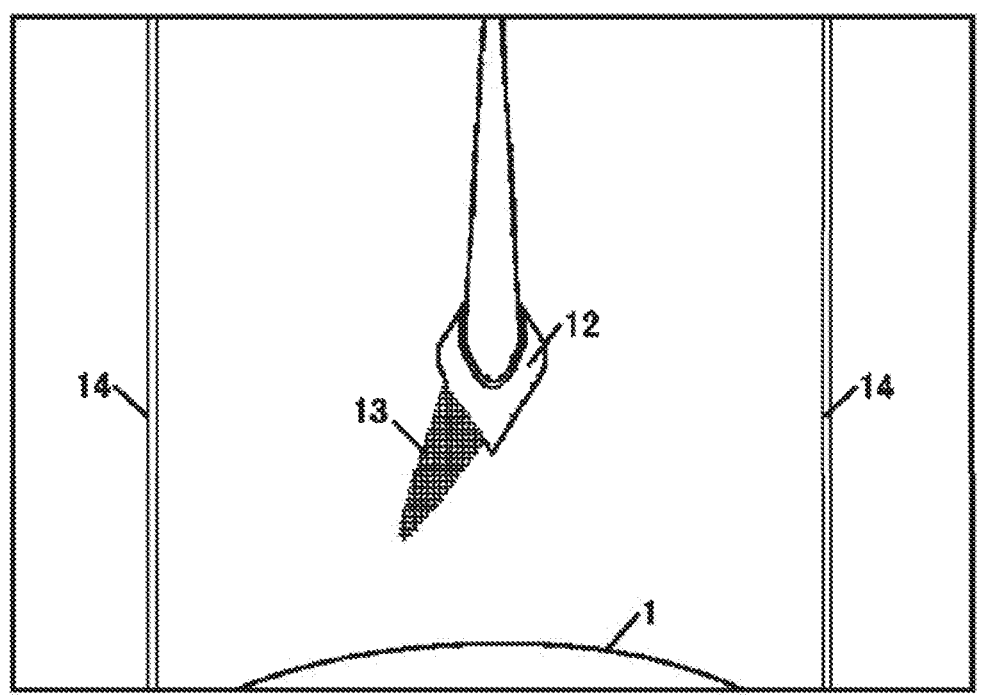
FIG. 6 illustrates a partial transform image obtained by transforming the partial road surface image obtained from the camera 3 in the road surface detection apparatus according to embodiment 1.

The partial road surface image as shown in FIG. 5 can be taken by the camera 3 mounted at the front portion of the vehicle 1 so as to include the road surface as shown in FIG. 4.

FIG. 5 shows a partial road surface image taken by the camera 3 of the vehicle 1, and the image includes a pylon 12 as an obstacle on a road surface, a pylon shadow 13 of the pylon 12 on the road surface, and white lines 14. In such a partial road surface image, projective transformation of a region A that includes the road surface near the vehicle 1 is performed to transform the region A to a partial transform image as taken by the virtual camera 3' by which the region A is viewed from thereabove. FIG. 6 shows an example of the partial transform image obtained by the projective transformation. In the projective transformation, an obstacle (for example, the pylon 12) having a height in the partial road surface image shown in FIG. 5 is handled as if the obstacle is a pattern (for example, the white lines 14 on an asphalt road surface), on the road surface, which does not have a height. Therefore, as shown in FIG. 6, the pylon 12 having a height is transformed so as to be elongated from the vehicle 1 in the depth direction.

A position of the pylon 12 on the partial transform image can be calculated from the partial transform image obtained by the projective transformation. In embodiment 1, the partial transform image is obtained by the projective transformation of the region A. Therefore, the partial transform image and the region A have a correspondence relationship. Thus, a coordinate of the pylon 12 on the partial transform image can be geometrically obtained by using the position of the camera 3, the position of the camera 3', an angle of view of the camera 3, a focal length thereof, and the size of a coordinate transform image.

Figure 7:
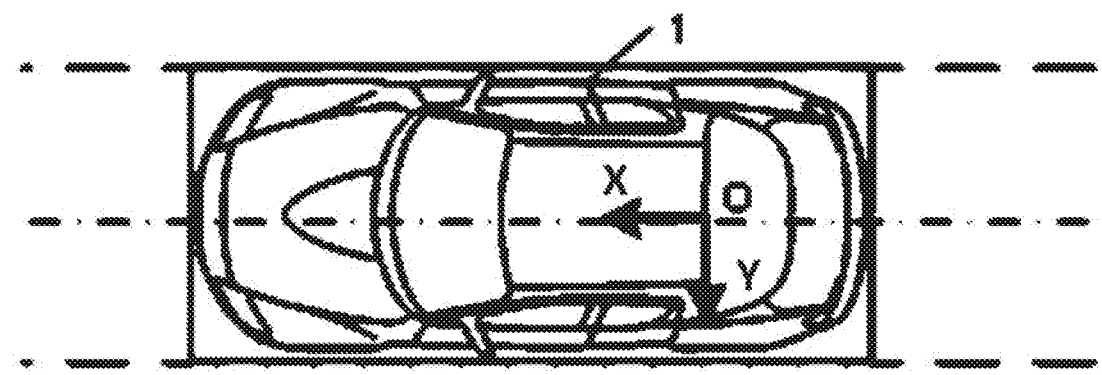
FIG. 7 illustrates a coordinate system of the road surface detection apparatus according to embodiment 1.

The coordinate is based on a coordinate system, as shown in FIG. 7, in which the center of the rear axle of the vehicle 1 is the originating point 0. In the coordinate system, the axis from the originating point 0 toward the front side of the vehicle 1 is the X axis, and the axis from the originating point 0 toward the left side of the vehicle 1 is the Y axis.

In FIG. 3, in step S102, the obstacle distance detection unit 201 shown in FIG. 2 detects an obstacle distance. An obstacle in the imaging range is detected, and the obstacle distance that is a distance from the sonar sensor 2 to the obstacle closest to the sonar sensor 2 is detected. In a case where a plurality of obstacles are in the imaging range, the plurality of obstacle distances are detected and all the obstacle distances are stored.

In FIG. 3, the histogram generation region extraction unit 204 shown in FIG. 2 extracts a histogram generation region from the partial transform image, based on the obstacle distance detected in step S102.

Figure 8:
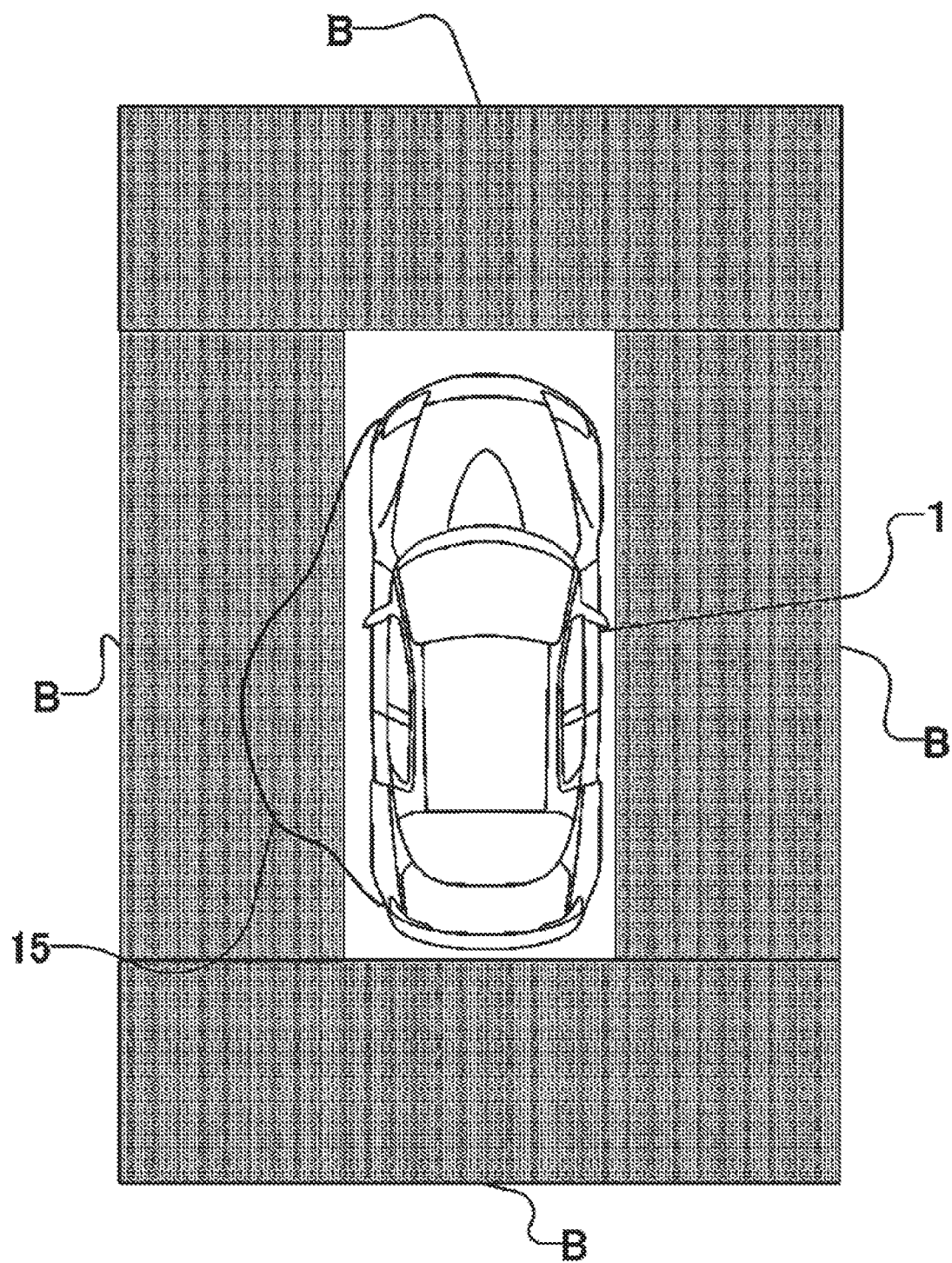
FIG. 8 illustrates a positional relationship between a vehicle 1 and a histogram generation region in the road surface detection apparatus according to embodiment 1.

FIG. 8 shows a positional relationship between the histogram generation region and the vehicle 1. FIG. 8 represents a bird's eye view image obtained by the vehicle 1 and the road surface around the vehicle 1 being viewed from thereabove. The image includes a shadow 15 of the vehicle on the road surface around the vehicle 1. The histogram generation region extraction unit 204 extracts four rectangular regions B that surround the portions adjacent to the vehicle 1, in the partial transform image obtained by transforming the partial road surface image taken by the cameras 3, as the histogram generation region. If the region B includes an obstacle, the obstacle may be erroneously detected as a road surface. Therefore, a road surface region that does not include an obstacle is calculated based on the obstacle distance detected by the sonar sensor 2, on the partial transform image, and is extracted as the histogram generation region.

In FIG. 3, in steps S103 to S107, in each partial road surface image, a distance between the vehicle 1 and the obstacle is calculated based on the obstacle distance, and the road surface region is calculated based on the calculated distance between the vehicle 1 and the obstacle, and is extracted as the histogram generation region in step S108. An example of the process will be described below in detail.

Firstly, in FIG. 3, in step S103, the histogram generation region extraction unit 204 shown in FIG. 2 determines whether or not the obstacle distance detection unit 201 detects an obstacle on the partial transform image. In a case where an obstacle is detected, the process shifts to step S104 in FIG. 3 in order to calculate the distance between the vehicle 1 and the obstacle based on the obstacle distance.

In a case where no obstacle is detected, the maximum detection distance of the sonar sensor 2 (see FIG. 1A) is set to the distance between the vehicle 1 and the obstacle, and the process shifts to step S108 in FIG. 3. In this case, 0.8 times the maximum detection distance of the sonar sensor 2 may be set to the distance between the vehicle 1 and the obstacle in consideration of the accuracy of the sonar sensor 2.

Figure 9:
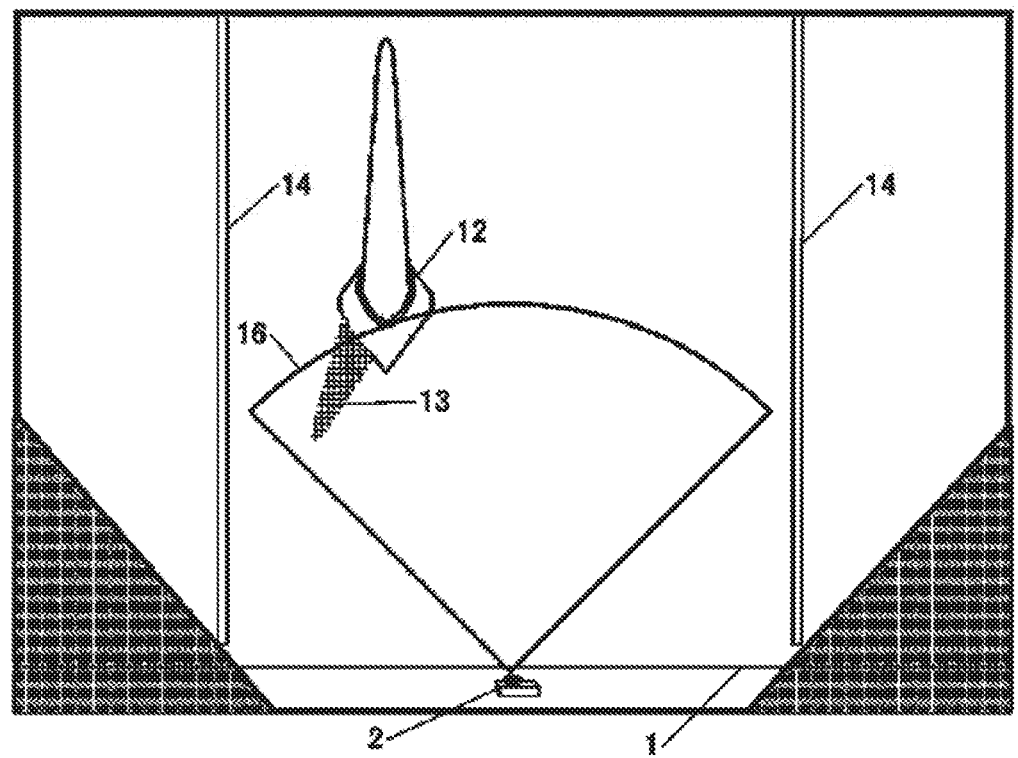
FIG. 9 illustrates a relationship between an obstacle distance and a partial transform image in the road surface detection apparatus according to embodiment 1.

In FIG. 3, in step S104, the histogram generation region extraction unit 204 shown in FIG. 2 calculates a coordinate of an arc, having a radius that is the obstacle distance, around the obstacle distance detection unit 201 on the partial transform image. FIG. 9 shows a relationship between the partial transform image and the obstacle distance. FIG. 9 shows an arc 16, around the sonar sensor 2, having a radius that is the obstacle distance detected by the sonar sensor 2 on the partial transform image. In this case, the pylon 12 is detected as an obstacle, and the pylon 12 is located on a position on the arc 16. The sonar sensor 2 detects only an obstacle having a height, so that the sonar sensor 2 does not detect the shadow 13 of the pylon as an obstacle.

Figure 10:
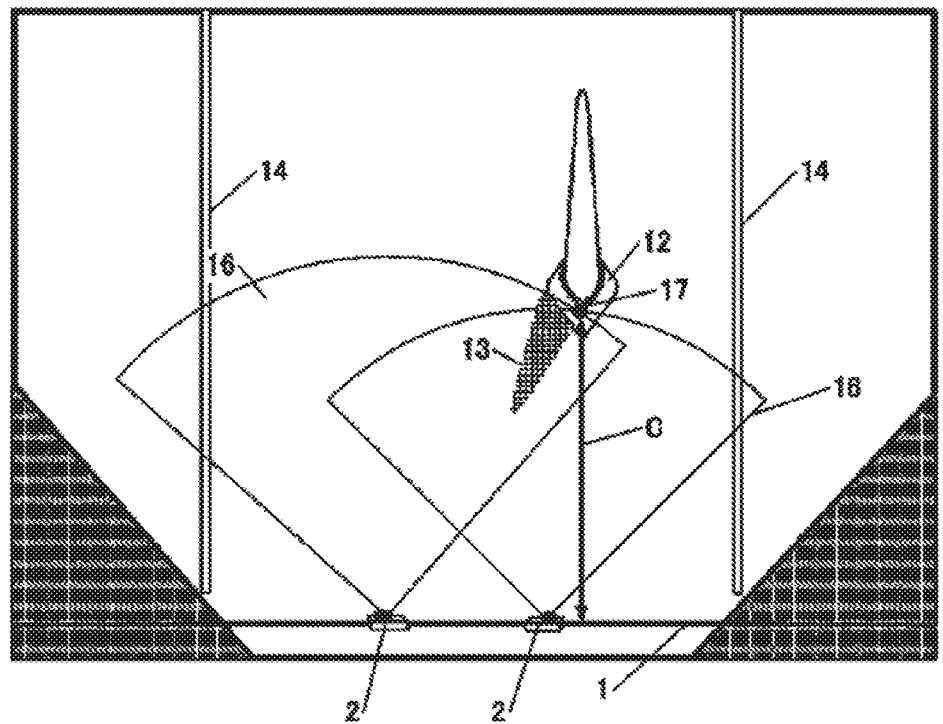
FIG. 10 illustrates a relationship between a distance C between the vehicle 1 and an obstacle and a point 17 of intersection of arcs on a composite transform image, in the case of a point of intersection of two circles based on two or more obstacle distances being obtained on the partial transform image in the road surface detection apparatus according to embodiment 1.

Furthermore, in FIG. 3, in step S105, the histogram generation region extraction unit 204 in FIG. 2 determines whether or not a point 17 of intersection of arcs is in each partial transform image, based on the coordinates of the arcs 16 calculated in step S104. FIG. 10 shows a relationship between two arcs 16 and the point 17 of intersection of the arcs in the partial transform image. The two sonar sensors 2 detect the pylon 12, whereby the point 17 of intersection of arcs which is formed by the two arcs 16 represents the coordinate of the pylon 12. As shown in FIG. 10, in a case where the point 17 of intersection of arcs is in the partial transform image, the point of intersection of the two obstacle distances, that is, the coordinate of the obstacle can be obtained. However, in a case where the point 17 of intersection of arcs is absent, the correct coordinate of the obstacle is not obtained. Therefore, a method for calculating the distance C between the vehicle 1 and the obstacle is changed between presence and absence of the point 17 of intersection of arcs. That is, in a case where the point 17 of intersection of arcs is in the partial transform image, the process shifts to step S106 in FIG. 3. In a case where the point 17 of intersection of arcs is absent, the process shifts to step S107.

In a case where the point 17 of intersection of arcs is in the partial transform image, the distance between the vehicle 1 and the obstacle is calculated based on a coordinate of the point 17 of intersection of the arcs in step S106 in FIG. 3. A method for calculating the point 17 of intersection of arcs and the distance C between the vehicle 1 and the obstacle will be described with reference to FIG. 10.

Firstly, the length of the line, perpendicular to the surface of the vehicle 1, which is drawn from the point 17 of intersection of the arcs is calculated. Since an error may be included in the obstacle distance depending on the accuracy of the sonar sensor 2, a value indicating 0.8 times or 0.6 times the length of the perpendicular line is outputted as the distance C between the vehicle 1 and the obstacle in consideration of the error.

In a case where a plurality of the points 17 of intersection of arcs are in the partial transform image due to a plurality of obstacles, the line perpendicular to the surface of the vehicle 1 is drawn from each of all the points 17 of intersection of the arcs, and a value indicating 0.8 times or 0.6 times the length of the shortest perpendicular line is outputted as the distance C between the vehicle 1 and the obstacle. A case where the sonar sensor 2 is used has been described. In a case where a sensor having a higher directivity is used, a value obtained by multiplying the calculated length of the perpendicular line by a magnification closer to 1 can be outputted as the distance C between the vehicle 1 and the obstacle.

In a case where the point 17 of intersection of arcs is not in the partial transform image, the distance between the vehicle 1 and the obstacle is calculated in step S107 in FIG. 3 from a coordinate of the arc 16 which is outputted in step S105.

Figure 11:
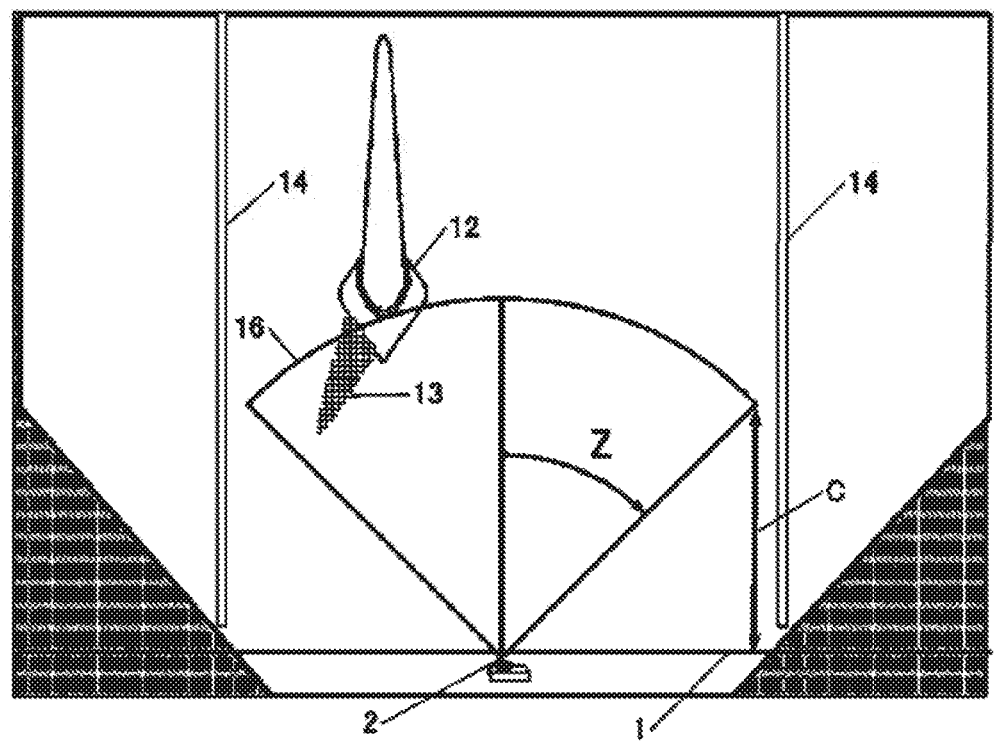
FIG. 11 illustrates a relationship between the distance C between the vehicle 1 and an obstacle, and an arc 16 on a composite transform image, in the case of one obstacle distance being obtained on the partial transform image in the road surface detection apparatus according to embodiment 1.

In FIG. 11, the sonar sensor 2 emits a sonic wave to an about Z-degree range from the front of the sonar sensor 2. Therefore, in a case where an obstacle is detected, the obstacle is in the ±Z-degree range relative to the center of the sonar sensor 2. The distance between the vehicle 1 and the obstacle is shortest when an obstacle is located in the Z-degree direction relative to the center of the sonar sensor 2. Accordingly, the distance is outputted as the distance C between the vehicle 1 and the obstacle. That is, when P represents the obstacle distance that is the radius of the arc 16, the distance C is calculated by using the following equation (1).

$$C = P \cos Z \tag{1}$$

In the example shown in FIG. 11, the distance C between the vehicle 1 and the obstacle in the case of Z=45 degrees is calculated.

Next, in FIG. 3, in step S108, the histogram generation region is extracted by using the distance C between the vehicle 1 and the obstacle calculated in step S106 or step S107 described above.

Figure 12:
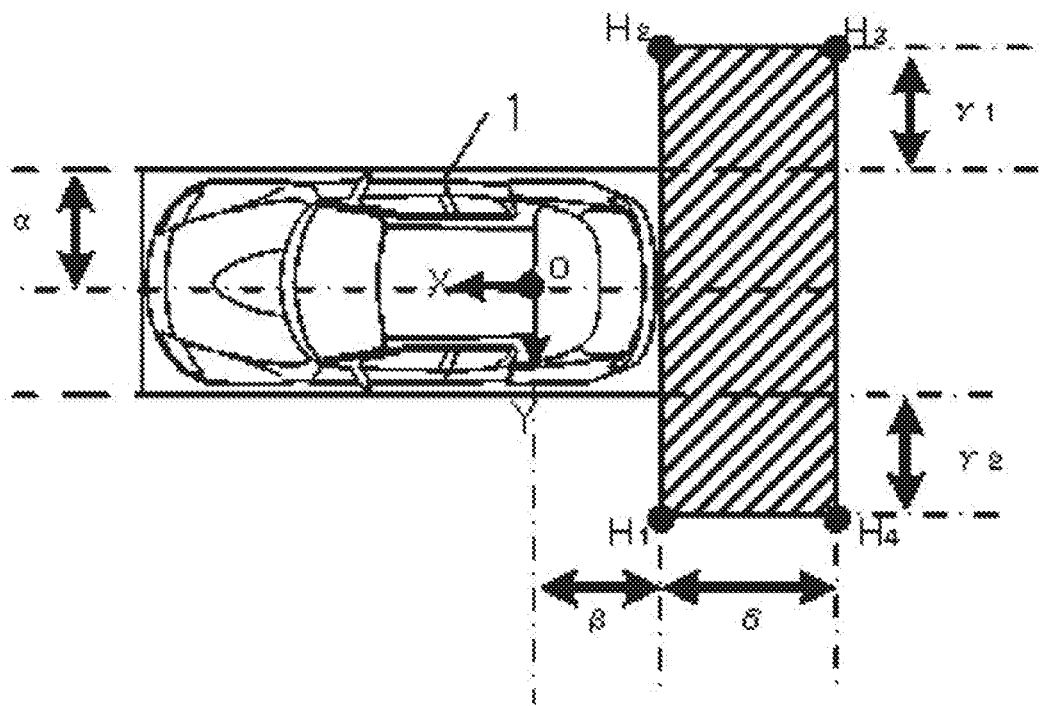
FIG. 12 illustrates coordinates of a histogram generation region in a partial transform image behind the vehicle 1 in the road surface detection apparatus according to embodiment 1.

An example of a method for extracting the histogram generation region will be described with reference to FIG. 12. In FIG. 12, in the partial transform image (hereinafter, referred to as the partial transform image behind the vehicle 1) obtained by transformation of the partial road surface image taken by the camera 3 disposed at the rear portion of the vehicle 1, the histogram generation region is set as a region surrounded by a point H1 to a point H4. The coordinates of the points H1 to H4 are represented as H1($-\beta,\alpha+\gamma_2$), H2($-\beta,-\alpha-\gamma_1$), H3($-\beta-\delta,-\alpha-\gamma_1$), H4($-\beta-\delta,\alpha+\gamma_2$) in the coordinate system described in FIG. 7. $\alpha$ represents half the length of the lateral width of the vehicle 1, and $\beta$ represents the length from the rear axle to the rear bumper. In FIG. 3, $\gamma_1$, $\gamma_2$, and $\delta$ are made variable based on the distance C, between the vehicle 1 and the obstacle, which is outputted in step S103 to step S107, whereby only the road surface region can be extracted as the histogram generation region. For example, in a case where the histogram generation region is calculated from the partial transform image behind the vehicle 1, $\delta$ is set to the distance C, between the vehicle 1 and the obstacle, which is calculated from the partial transform image behind the vehicle 1, $\gamma_1$ is set to the distance C, between the vehicle 1 and the obstacle, which is calculated from the right-side partial transform image, and $\gamma_2$ is set to the distance C, between the vehicle 1 and the obstacle, which is calculated from the left-side partial transform image. By calculating the histogram generation regions in the other partial transform images in the same method, the road surface region that surrounds the vehicle 1 as described above in FIG. 8 can be extracted as the histogram generation region. $\delta$, $\gamma_1$, and $\gamma_2$ may be set to the shortest distance C between the vehicle 1 and the obstacle among the distances C, between the vehicle 1 and the obstacle, calculated from the partial transform images to extract the histogram generation region.

In FIG. 3, in step S105, the method for calculating the distance C between the vehicle 1 and the obstacle is changed based on a result of determining whether or not the point 17 of intersection of arcs is in each partial transform image. However, the method is not necessarily limited thereto. For example, a value of 0.8 times the shortest obstacle distance in each partial transform image may be set to the distance C between the vehicle 1 and the obstacle regardless of presence or absence of the point 17 of intersection of arcs. In a case where the obstacle distance is not detected, a value of 0.8 times the maximum detection distance of the sonar sensor 2 may be calculated as the distance C between the vehicle 1 and the obstacle. The method for calculating the histogram generation region is not limited as long as the object of the present disclosure can be achieved.

In FIG. 3, in step S109, the histogram generation region combining unit 205 shown in FIG. 2 combines a plurality of the histogram generation regions extracted by the histogram generation region extraction unit 204, and outputs the combined region as the histogram generation composite region.

The histogram generation region combining unit 205 estimates a probability that each histogram generation region is a road surface, based on the vehicle signal outputted by the vehicle signal detection unit 202, and enlarges the histogram generation region that is highly likely to be the road surface, and reduces the size of the histogram generation region that is less likely to be the road surface. After such an enlarging and size-reducing process, image data is stored in the arrangement of RGB pixel values and outputted as the histogram generation composite region. By enlarging and reducing the size of each histogram generation region according to the probability that the histogram generation region is the road surface, the probability that the histogram generation composite region obtained by the combination includes an obstacle is reduced. In embodiment 1, the magnification calculated for the enlarging and size-reducing process is referred to as a combination ratio.

In embodiment 1, shift information is used as the vehicle signal in order to calculate the combination ratio. Since the current running direction of the vehicle 1 can be obtained from the shift information, a value that is less than 1 is calculated as the combination ratio of the histogram generation regions in the running direction, and a value that is greater than 1 is calculated as the combination ratio of the histogram generation regions that are considered to be a road surface, in the direction opposite to the running direction, on which the vehicle has been running. Thus, a probability that each histogram represents a road surface is estimated from the vehicle signal to change the combination ratio. In embodiment 1, an example where the shift information is used as the vehicle signal is described. However, the histogram generation region may be calculated by using another vehicle speed signal representing a yaw rate, a vehicle speed, or the like.

In embodiment 1, in FIG. 3, in step S109, the histogram generation region combining unit 205 shown in FIG. 2 changes the combination ratio of the histogram generation regions by using the vehicle signal. However, the histogram generation region extraction unit 204 shown in FIG. 2 may perform this process in step S108 in FIG. 3. That is, when the histogram generation region is calculated, the length of the distance C between the vehicle 1 and the obstacle is corrected based on the vehicle signal, whereby the probability that the histogram generation region includes an obstacle can be reduced. For example, the previous running region and the current running direction are estimated from the vehicle signal, and, in a case where the partial transform image includes a previous running region, the distance C between the vehicle 1 and the obstacle is calculated so as to be enlarged as compared with a case where the partial transform image does not include a previous running region. Alternatively, based on the running direction, the distance C between the vehicle 1 and the obstacle which is calculated from the partial transform image in the running direction is calculated so as to be shorter than the distance C between the vehicle 1 and the obstacle in the partial transform image in the direction opposite to the running direction. Alternatively, the distance C between the vehicle 1 and the obstacle in the partial transform image in the direction opposite to the running direction may be calculated so as to be longer than the distance C between the vehicle 1 and the obstacle which is calculated from the partial transform image in the running direction.

Figure 13:
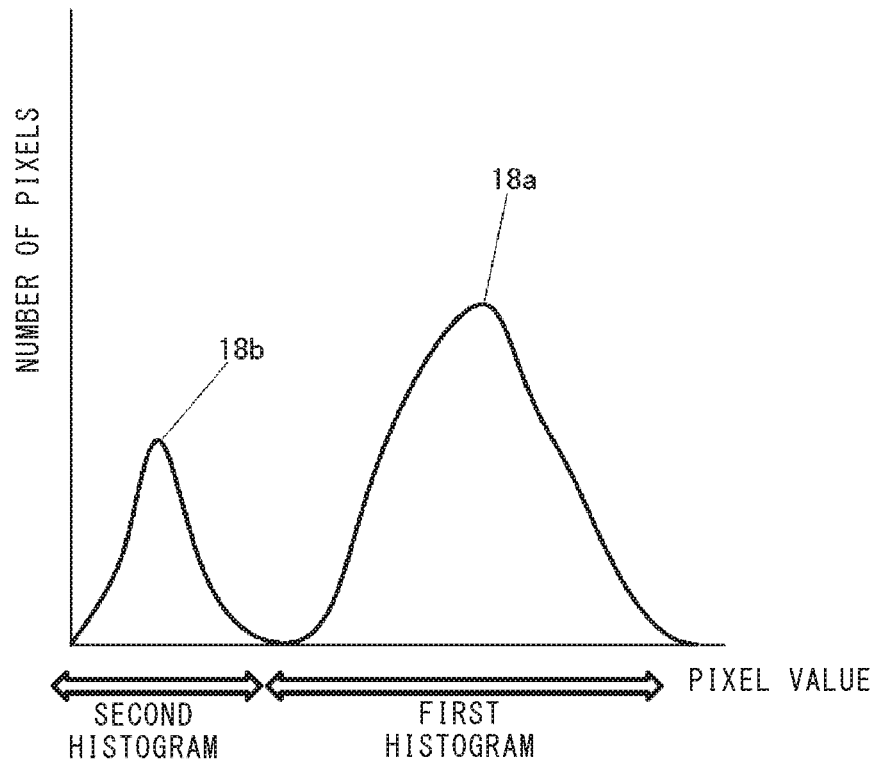
FIG. 13 illustrates a histogram based on a histogram generation composite region and a histogram separation method in the road surface detection apparatus according to embodiment 1.

In FIG. 3, in step S110, the histogram calculation unit 206 shown in FIG. 2 calculates a histogram representing the frequency of the number of pixels having the RGB pixel value in the histogram generation composite region. FIG. 13 illustrates an example of the histogram. In the histogram, the horizontal axis represents a pixel value, and the vertical axis represents the number of pixels. In embodiment 1, the pixel value is represented by 256 gradations, and the minimum value is 0 and the maximum value is 255, and the histogram is generated for each of R, G, and B of the RGB pixel value. The road surface detection is performed by using a color image. However, the road surface detection can be performed also by using a monochrome image. In this case, the number of the histograms to be generated may be one.

The characteristics of the histogram generated in embodiment 1 will be described. The histogram generation region is formed from a road surface around the vehicle 1, and the road surface includes an in-sunlight road surface corresponding to a road surface in sunshine, and a shadow road surface corresponding to a road surface including a shadow of the vehicle 1 or a structural object. The shadow road surface is not in sunshine and thus has a brightness value that is less than the in-sunlight road surface on the image. Therefore, in a case where the histogram generation region includes a shadow of the vehicle, the histogram includes a first peak based on the in-sunlight road surface and a second peak based on the shadow road surface as shown in FIG. 13, and the second peak has a pixel value less than the first peak. Furthermore, in a case where a white line and a manhole are around the vehicle 1 in the histogram generation region, peaks based on them are included.

In FIG. 3, in step S111, the histogram separation unit 207 shown in FIG. 2 separates the histogram generated in step S110 into a first histogram and a second histogram. In embodiment 1, the first histogram is based on the in-sunlight road surface corresponding to a road surface in sunshine, and the second histogram is based on the shadow road surface corresponding to a road surface including a shadow. The histogram separation unit 207 shown in FIG. 2 retrieves the two peaks having the greatest and the second greatest number of pixels, and extracts, as the second histogram, a histogram around a peak 18b having the smaller pixel value of the two peaks, and extracts, as the first histogram, a histogram that includes a peak 18a having the greater pixel value of the two peaks.

As a method for retrieving the peak 18a and the peak 18b in the histogram, for example, a method using a low pass filter or differentiation can be used. However, the method is not the feature of this technique, and the description thereof is omitted.

Figure 14:
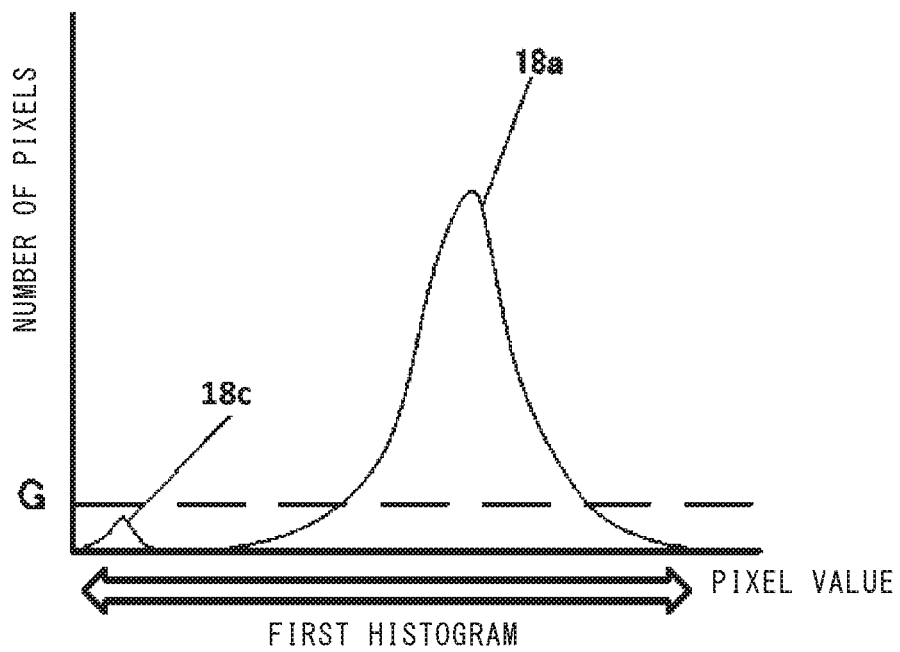
FIG. 14 illustrates a histogram from which a second histogram cannot be extracted in the road surface detection apparatus according to embodiment 1.

As shown in FIG. 14, in a case where the second greatest peak value 18c in the histogram is less than or equal to a certain value G, no shadow is determined to be around the vehicle 1, and the entirety of the histogram is extracted as the first histogram without extracting the second histogram.

However, in a case where a manhole or the like is in the histogram generation region, a high peak may be formed in the histogram based on not a shadow but the manhole. For such a case, for example, a histogram determination unit may be provided to compare a previous second histogram and a candidate of the second histogram in the current histogram with each other. The histogram determination unit determines whether or not the candidate of the second histogram is a histogram based on the shadow road surface, and prevents a histogram based on a road surface structural object such as a manhole from being erroneously extracted as the second histogram. For example, comparison between the shape of the previous second histogram and the shape of the current candidate of the second histogram, specifically, comparison between the histograms in a pixel value range, a peak value, a variance, or the like is performed, to calculate similarity between the histograms, thereby determining whether or not the candidate of the second histogram is based on the shadow road surface. In a case where the determination result indicates that the candidate of the second histogram is not based on the shadow road surface, the candidate of the second histogram is discarded, and the previously stored second histogram is extracted instead as the second histogram. Thus, even in a case where the histogram generation region temporarily includes a manhole, a white line, or the like in a wide range, the shadow road surface can be identified.

Figure 15:
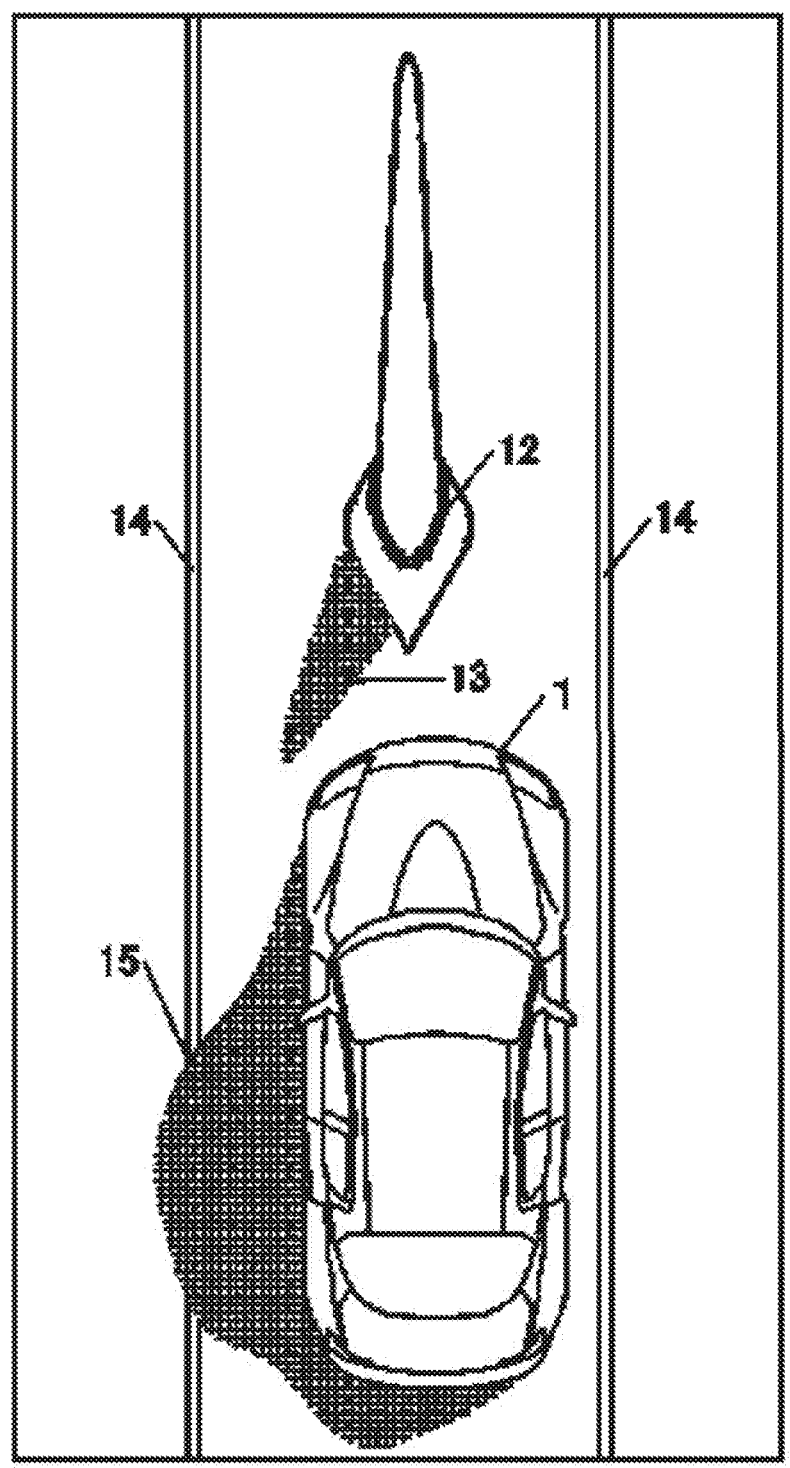
FIG. 15 illustrates a composite transform image in the road surface detection apparatus according to embodiment 1.

In FIG. 3, in step S112, the transform image combining unit 208 shown in FIG. 2 generates a composite transform image used for road surface detection, from the partial transform images. In embodiment 1, the partial transform images based on the partial road surface images taken by the four cameras 3 shown in FIG. 1A are combined, to generate a composite transform image as shown in FIG. 15. For convenience of description, in FIG. 15, the partial road surface images of the left, right, and rear portions of the vehicle 1 are partially removed, and the vehicle 1 which is not actually in the image is superimposed at the center of the composite transform image, and the pylon 12 as an obstacle, the shadow 13 of the pylon 12, and the shadow 15 of the vehicle are included.

In FIG. 3, in step S113, the first region extraction unit 209 shown in FIG. 2 extracts a first region from the composite transform image by using the first histogram shown in FIG. 13. Similarly, in FIG. 3, in step S114, the second region extraction unit 210 shown in FIG. 2 extracts a second region from the composite transform image by using the second histogram shown in FIG. 13. As a method for extracting the road surface region based on the histogram, for example, a histogram back projection or a method in which all the pixels having pixel values in the region of the histogram are extracted are considered.

In embodiment 1, an example where the region is extracted by using the histogram back projection will be described. In the histogram back projection, whether or not a target pixel is included in the histogram is determined based on the frequency of each pixel value in the histogram. The method for process of the histogram back projection will be described in detail. Firstly, the RGB pixel value of each pixel is obtained. Next, the number of pixels having the obtained pixel value is obtained with reference to each histogram of the RGB, and the pixel number total value that is a value obtained by summing each of the pixel numbers is calculated. In a case where the pixel number total value is greater than or equal to a predetermined value, the brightness value of 255 is outputted. In a case where the pixel number total value is less than the predetermined value, the brightness value of 0 is outputted. This process is performed for all the pixels in the composite transform image, thereby outputting a binarized image of the composite transform image. In the binarized image, a region having the brightness value of 255 is a region based on the histogram.

Figure 16:
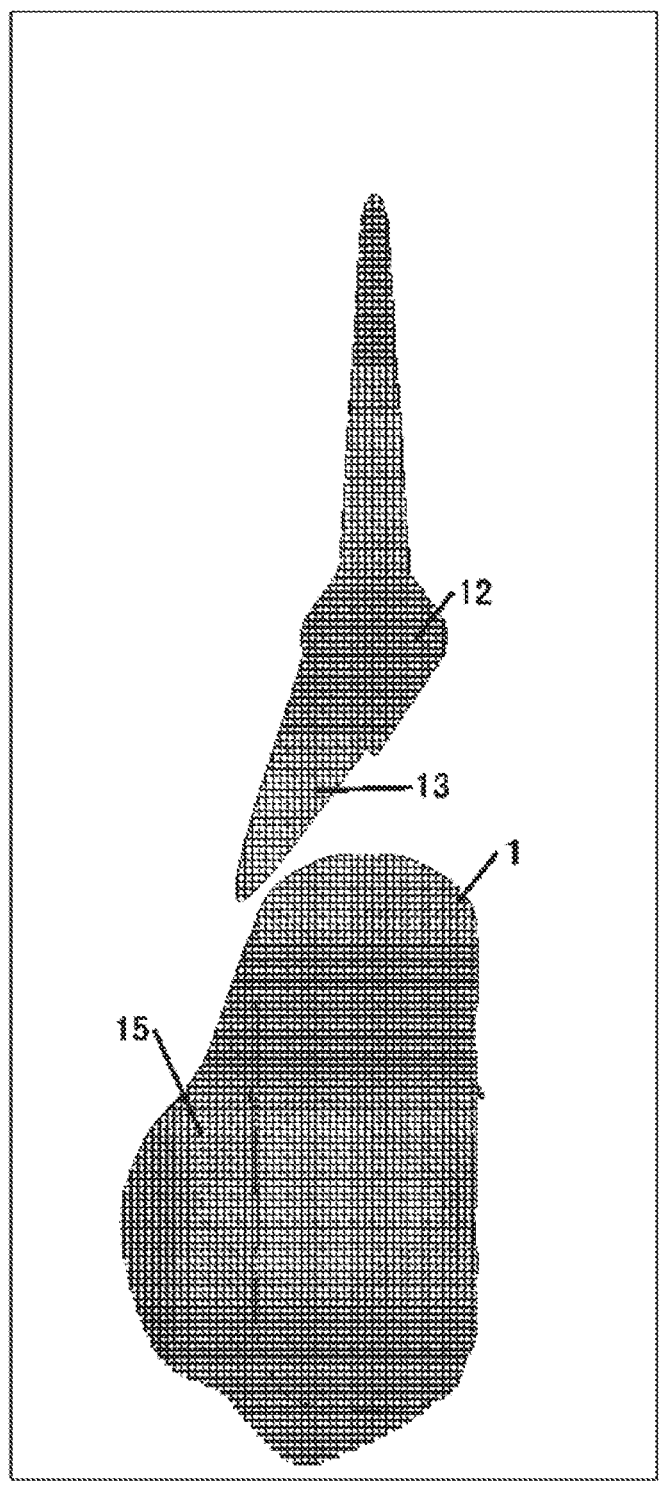
FIG. 16 illustrates an image in which a brightness value is 255 for a first region and the brightness value is 0 for the other regions, in the composite transform image in the road surface detection apparatus according to embodiment 1.
Figure 17:
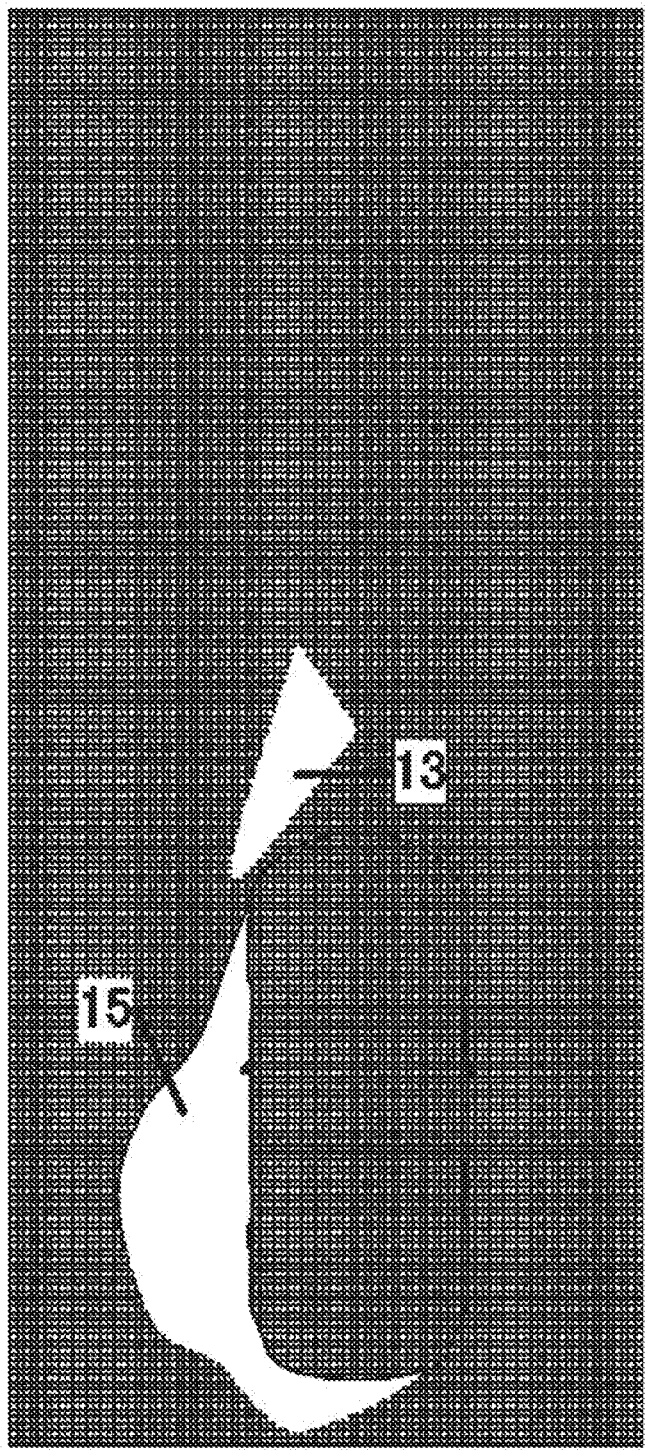
FIG. 17 illustrates an image in which a brightness value is 255 for a second region and the brightness value is 0 for the other regions, in the composite transform image in the road surface detection apparatus according to embodiment 1.

Example of images outputted by the first region extraction unit 209 and the second region extraction unit 210 shown in FIG. 2 with the use of the histogram back projection will be described with reference to FIG. 15, FIG. 16, and FIG. 17. An image, shown in FIG. 15, which is the composite transform image described above is inputted to the road surface detection device, so that an image, representing the first region, outputted by the first region extraction unit 209 is as shown in FIG. 16, and an image, representing the second region, outputted by the second region extraction unit 210 is as shown in FIG. 17. In FIG. 16, the white portion represents an in-sunlight road surface that is the first region having a brightness value of 255, and a hatched portion represents a region, other than the in-sunlight road surface, having a brightness value of 0. The hatched portion in FIG. 16 represents the pylon 12, the shadow 13 of the pylon, and the shadow 15 of the vehicle. Although the brightness value of 0 originally represents black color, the hatched portion is indicated for indicating the drawing frame and reference numbers. Similarly in the drawings described below, the brightness value is 0 for the hatched portion. In FIG. 17, the white portion represents the shadow 13 of the pylon and the shadow 15 of the vehicle which are the second region having the brightness value of 255, and the hatched portion represents the in-sunlight road surface and the pylon 12 each having the brightness value of 0. In FIG. 3, in step S111, in the histogram calculated in step S110, in a case where the second greatest peak value 18c is less than or equal to the certain value G as shown in FIG. 14, and the second histogram is not extracted, step S114 is skipped in FIG. 3.

Thus, the road surface detection apparatus repeatedly performs the process from step S101 to step S114 in FIG. 3 as described above each time an image is inputted from the imaging unit 200 in FIG. 2.

In the road surface detection apparatus according to embodiment 1, road surface detection is performed in the composite transform image. However, in FIG. 3, in step S112, when the partial transform images are combined, the transform image combining unit 208 shown in FIG. 2 does not perform the combining process, and the partial transform image may be outputted to perform road surface detection in the partial road surface image.

As described above, the following effect is exerted according to embodiment 1.

Function and Effect of Embodiment 1

The road surface detection apparatus of embodiment 1 obtains an image of a road surface around the vehicle 1 by using the camera 3, further performs transformation to the partial transform image, measures the obstacle distance to an obstacle around the vehicle by using the sonar sensor 2, extracts, as the histogram generation region, a region that does not include the obstacle in the partial transform image based on the obstacle distance, combines the histogram generation regions based on the vehicle signal to generate the histogram generation composite region, separates the histogram of the histogram generation composite region such that an element that includes the first peak value is the first histogram based on the in-sunlight road surface, and an element that includes the second peak value is the second histogram based on the shadow road surface, combines the partial transform images to generate the composite transform image, and extracts the first region that is the in-sunlight road surface, from the composite transform image, by using the first histogram and extracts the second region that is the shadow road surface, from the composite transform image, by using the second histogram. Therefore, a road surface can be detected without influence of the shadow. Thus, the road surface detection apparatus and the road surface detection method which have higher accuracy as compared with conventional art can be provided.

In step S111 in which the histogram is separated, in a case where the second greatest peak value is less than or equal to a certain value, the entirety of the histogram is extracted as the first histogram without extracting the second histogram. Thus, for example, in a case where the altitude of the sun is high, or in a case where the sun is behind clouds and illuminance is low, no shadow can be determined to be around the vehicle 1. Therefore, extraction of the second histogram is skipped to reduce load on calculation. Even when this process step is not performed, the function is implemented without problems.

Furthermore, in the histogram generation region extraction unit 204, the histogram generation region can be made variable by using the obstacle distance outputted by the obstacle distance detection unit 201, thereby preventing the obstacle from being erroneously detected as a road surface.

Even when the obstacle distance detection unit 201 is damaged, the function is implemented without problems.

For example, in a case where the sonar sensor 2 is damaged, the obstacle distance cannot be detected. Therefore, the process steps from step S102 to step S108 are not correctly performed. Accordingly, the process steps are skipped, and a certain constant distance is outputted as the distance C between the vehicle 1 and the obstacle, to extract the histogram generation region. In a case where the obstacle distance detection unit 201 is damaged, the obstacle distance is not detected, or an incorrect obstacle distance is detected. Thus, a detection range of the sonar sensor 2 may include an obstacle. Then, the distance C between the vehicle 1 and the obstacle is set to, for example, a short distance such as 0.5 m or 1 m, thereby preventing the histogram generation region from including an obstacle.

In the histogram generation region combining unit 205, the vehicle signal is used to change the combination ratio of the histogram generation regions, thereby extracting the histogram generation region which is highly likely to be a road surface. Therefore, for example, also in a case where the obstacle distance detection unit 201 is damaged and the obstacle distance cannot be detected, or in a case where a vehicle does not have the obstacle distance detection unit 201, the road surface detection can be performed.

In embodiment 1, an example where the partial road surface image that represents a portion around the vehicle 1 is transformed to the partial transform image that represents a bird's eye view, has been described. However, a road surface can be detected by extracting the histogram generation region from the partial road surface image without performing transformation to the partial transform image. The process step of step S101 is skipped, thereby reducing a load on calculation by the process. Therefore, the configuration of the road surface detection apparatus may be changed depending on the performance of the calculation device 10. In the case where the calculation device 10 has a low performance, road surface detection can be performed by using the above-described method to reduce the load on calculation. In the case where the calculation device 10 has a high performance, road surface detection can be performed in the partial transform image obtained by projective transformation of the partial road surface image, thereby performing road surface detection with high accuracy.

Embodiment 2

Embodiment 2 is related to the road surface detection apparatus and an image display apparatus that performs color substitution in the second region outputted by the road surface detection apparatus, by using color information of the first region which can be obtained from the first histogram, and that performs display on an image display unit.

Figure 18:
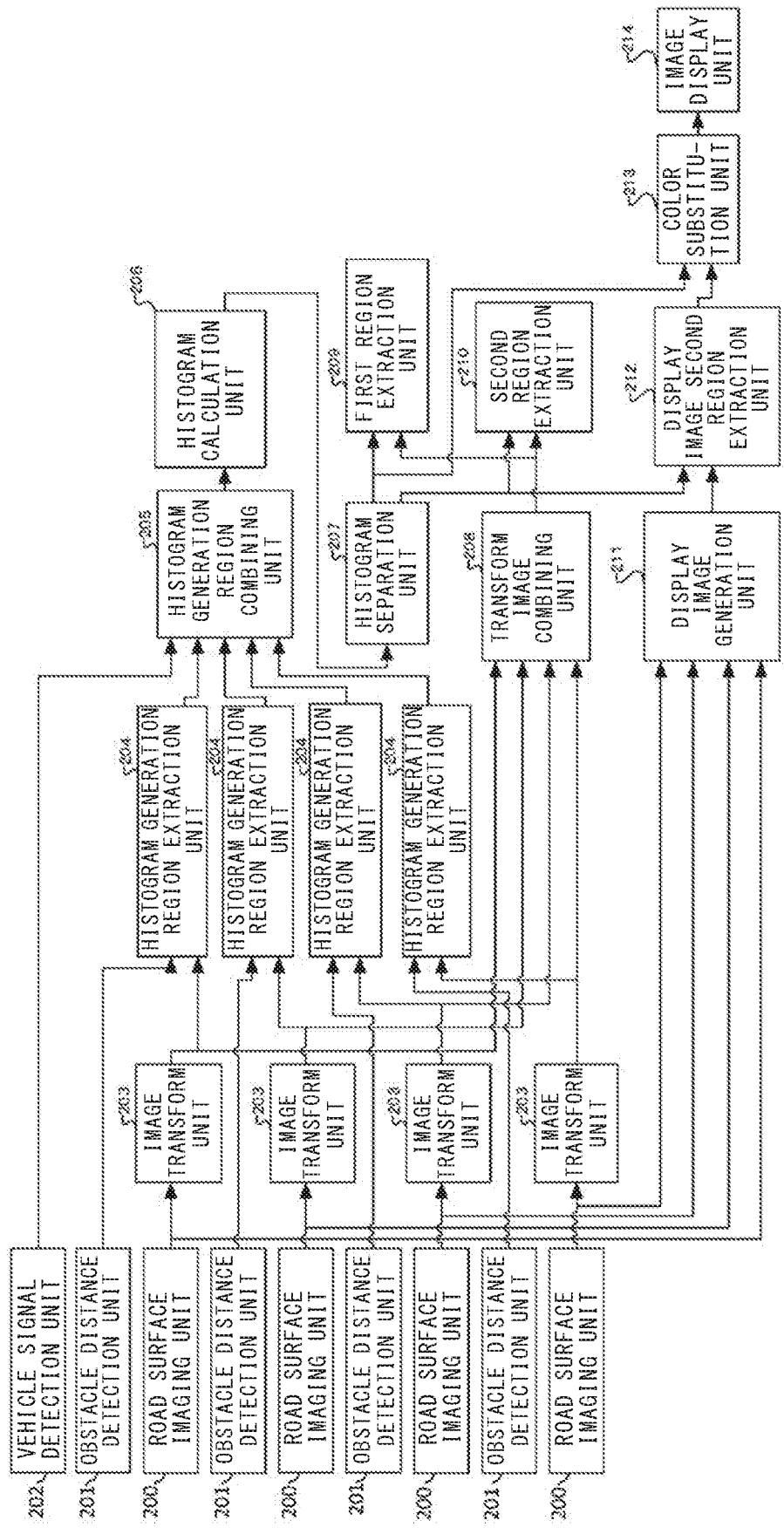
FIG. 18 is a functional block diagram illustrating an image display apparatus according to embodiment 2.

FIG. 18 is a functional block diagram illustrating a functional configuration of the road surface detection apparatus and the image display apparatus according to embodiment 2. A display image generation unit 211, a display image second region extraction unit 212, a color substitution unit 213, and an image display unit 214 are additionally provided in the functional block of embodiment 1.

An operation of the image display apparatus of embodiment 2 will be described based on differences from the operation in embodiment 1 with reference to a flow chart shown in FIG. 19.

Figure 19:
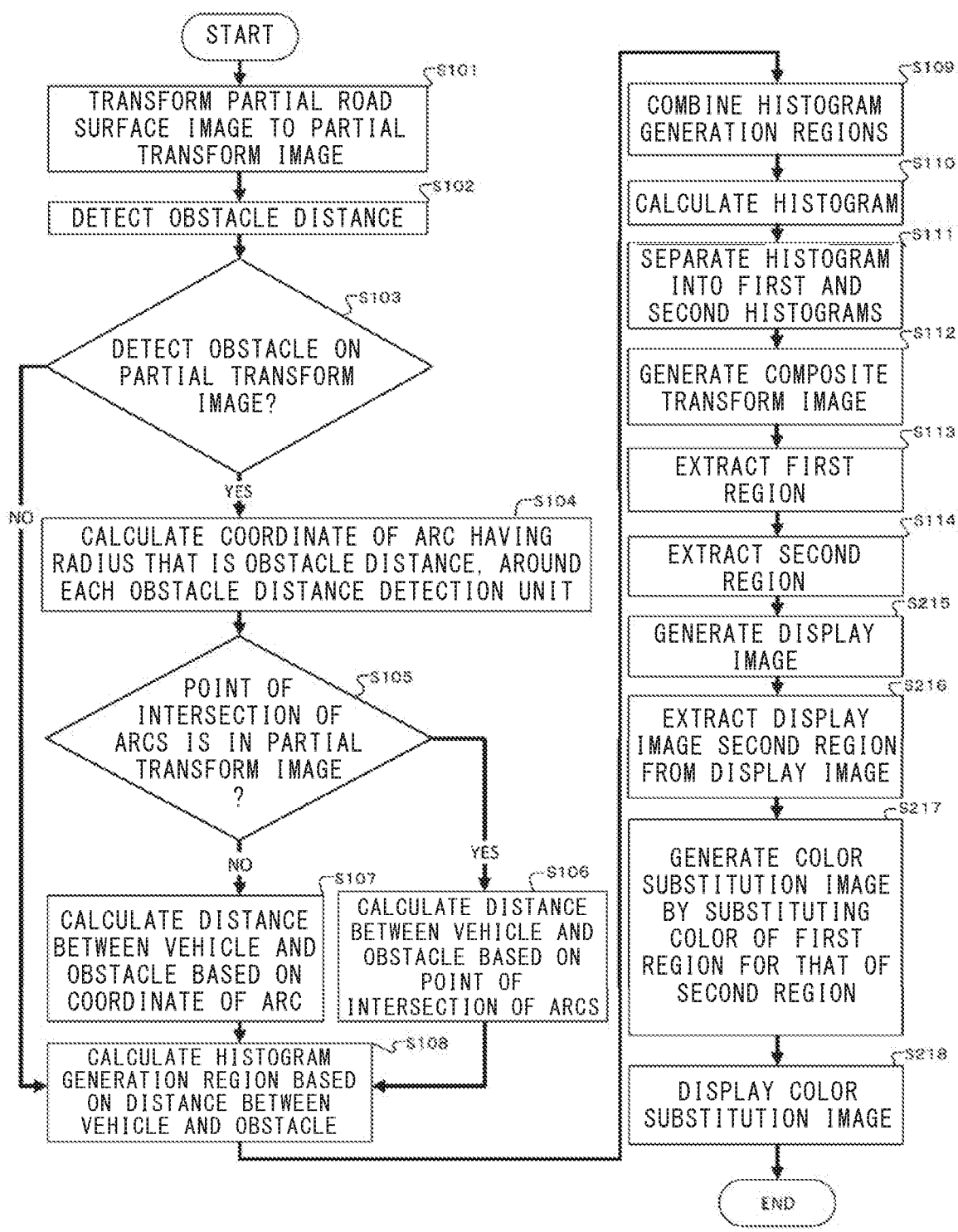
FIG. 19 is a flow chart showing an operation of the image display apparatus according to embodiment 2.

In FIG. 19, process steps of step S101 to step S114 are the same as shown in FIG. 3 for embodiment 1. In step S215, the display image generation unit 211 shown in FIG. 18 generates a display image to be displayed by the image display apparatus, from a partial road surface image obtained by the imaging unit 200. For example, the display image generation unit 211 performs the same processes as those by the image transform unit 203 and the transform image combining unit 208 to output, as a display image, a composite transform image that represents a bird's eye view obtained by a road surface around the vehicle 1 being viewed from thereabove. The display image generated by the display image generation unit 211 may be of any kind as long as the image can be generated from the partial road surface image. For example, one of a plurality of the partial road surface images may be used as the display image, or a composite image obtained by combining a plurality of the images into one image may be used as the display image. Furthermore, a three-dimensional model or a 3D view of a portion around the vehicle 1 may be generated from the partial road surface image. Moreover, a display image selection unit may be provided to allow a user to select a display image, thereby outputting an image selected by the user as the display image.

Next, in FIG. 19, in step S216, the display image second region extraction unit 212 shown in FIG. 18 extracts a display image second region that is the second region in the display image, from the display image generated in step S215, by using the second histogram calculated in step S111. As a method for extracting the second region based on the histogram, for example, histogram back projection, or a method in which all the pixels having pixel values in a value range of the histogram are extracted are considered. In embodiment 2, similarly to step S113 and step S114, the histogram back projection is used to perform the extraction.

Thereafter, in FIG. 19, in step S217, the color substitution unit 213 shown in FIG. 18 performs substitution for a pixel value of the display image second region extracted in step S216, by using color information of the first histogram calculated in step S111, and outputs the result as a color substitution display image. In embodiment 2, the pixel value of the highest peak is calculated from the first histogram as a color to be used for the color substitution. An image obtained by the color substitution for the display image second region by using the calculated color is outputted as the color substitution display image. Any kind of the method for calculating the color of the first histogram can be used as long as the object of this technique can be achieved.

Finally, in FIG. 19, in step S218, the image display unit 214 shown in FIG. 18 displays the color substitution display image obtained by the color substitution in step S217. The image display unit 214 can display an image and can have any shape and size. In embodiment 2, a display (not shown) of a car navigator mounted in the vehicle is used as the image display unit. The image can be displayed on a mobile phone, a smartphone, a tablet device, or a display outside the vehicle as well as the display unit mounted in the vehicle in a case where, for example, communication means such as Wi-Fi is provided.

Function and Effect of Embodiment 2

Thus, the image display apparatus of embodiment 2 uses the first histogram and the second histogram outputted by the road surface detection apparatus of embodiment 1 to extract the second region from a display image generated by the display image generation unit, performs color substitution of substituting a pixel value of the first region calculated from the first histogram for a pixel in the extracted display image second region, and outputs the color substitution display image obtained by the color substitution to the image display unit. Thus, a shadow can be removed from the display image that represents a bird's eye view obtained by a road surface around the vehicle 1 being viewed from thereabove, and a user is allowed to more simply recognize an obstacle around the vehicle 1 as compared with a display image that includes a shadow. In embodiment 2, an example where a shadow is removed from the bird's eye view around the vehicle 1 to display an image is described. This technique can be applied to all the images obtained by transforming an image obtained from the camera 3 of the vehicle 1. Therefore, also when, for example, a 3D view around the vehicle 1 is generated from an image obtained from the camera 3, a shadow can be removed from the 3D view, and the 3D view which is easily viewed by a user can be provided.

Embodiment 3

Embodiment 3 is related to the road surface detection apparatus and an obstacle detection apparatus for detecting an obstacle based on the first region and the second region outputted by the road surface detection apparatus.

Figure 20:
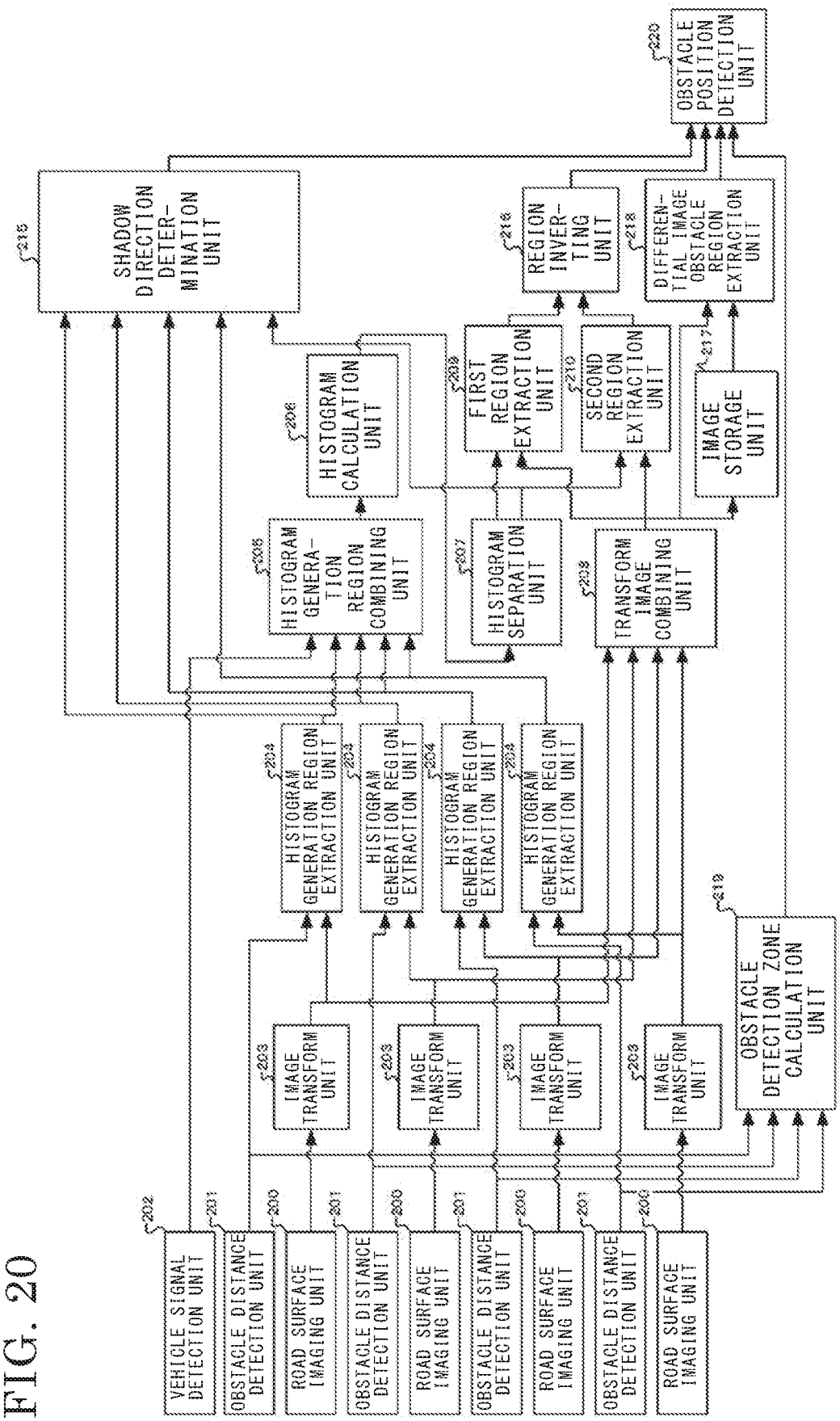
FIG. 20 is a functional block diagram illustrating an obstacle detection apparatus according to embodiment 3.

FIG. 20 is a functional block diagram illustrating a functional configuration of the road surface detection apparatus and the obstacle detection apparatus for detecting an obstacle based on the output from the road surface detection apparatus, according to embodiment 3. A shadow direction determination unit 215, a region inverting unit 216, an image storage unit 217, a differential image obstacle region extraction unit 218, a second obstacle distance detection unit, an obstacle detection zone calculation unit 219, and an obstacle position detection unit 220 are additionally provided in the functional block configuration of embodiment 1.

Similarly to the obstacle distance detection unit 201, the second obstacle distance detection unit detects an obstacle around the vehicle 1, and detects the obstacle distance between the second obstacle distance detection unit and the obstacle. The obstacle distance detection unit 201 may double as the second obstacle distance detection unit. In embodiment 3, the second obstacle distance detection unit includes a plurality of the sonar sensors 2, the sonar controller 7, and the sonar sensor wiring 6 connecting therebetween, as shown in FIG. 1A.

An operation of the obstacle detection apparatus according to embodiment 3 will be described based on differences from the operation in embodiment 1 with reference to a flow chart shown in FIG. 21.

Figure 21:
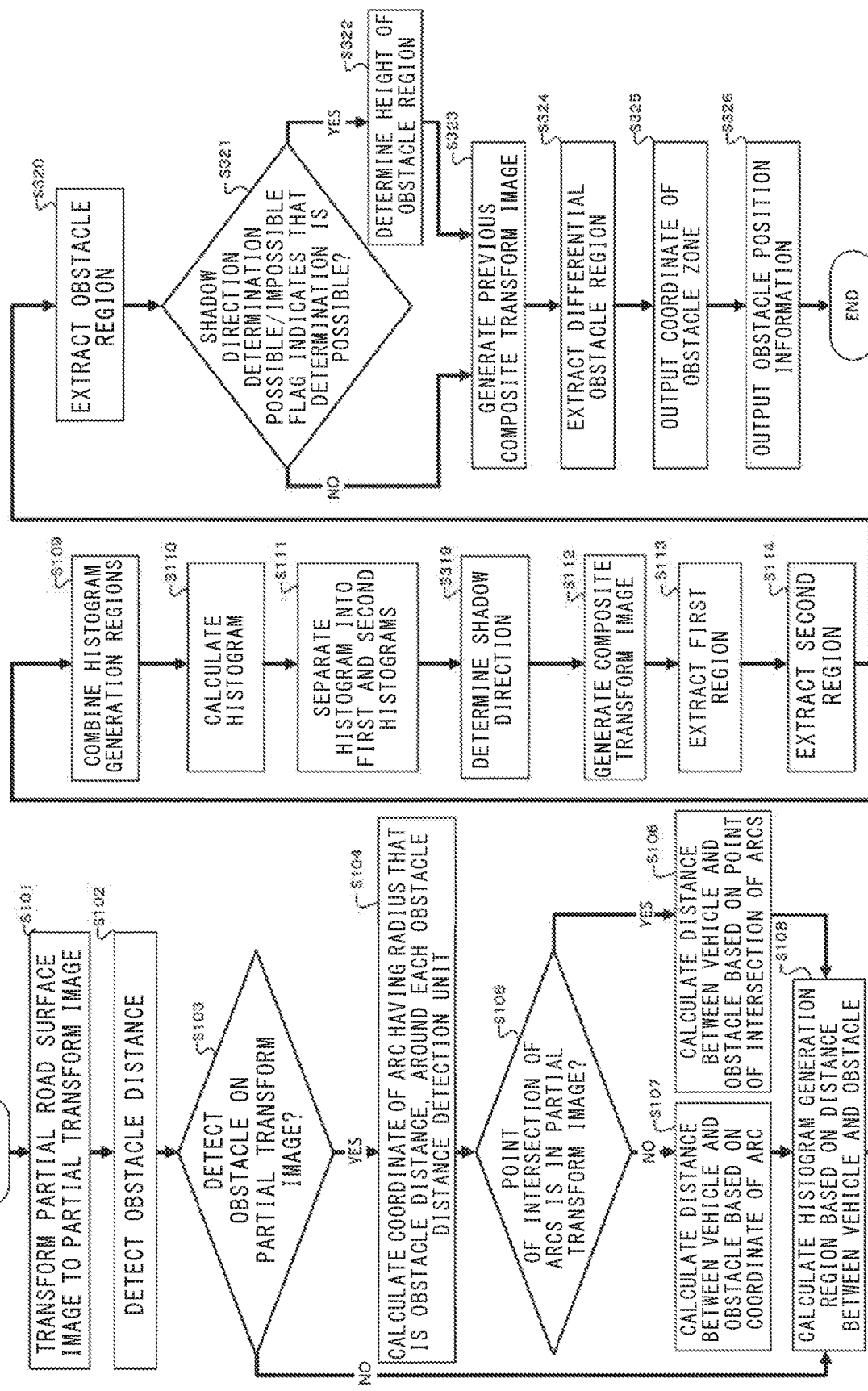
FIG. 21 is a flow chart showing an operation of the obstacle detection apparatus according to embodiment 3.

In FIG. 21, in step S319, the shadow direction determination unit 215 determines a shadow direction by using the second histogram extracted in step S111 and the four histogram generation regions extracted in step S108. The shadow direction determination unit 215 determines a direction of the shadow from the shape of the shadow, around the vehicle 1, which can be obtained by extracting a region of the shadow from the histogram generation region. For example, the shape of the shadow based on the stereoscopic shape of the vehicle 1 is stored for each light source direction in advance. In this process, a specific shadow direction need not be calculated. Therefore, for example, 36 kinds of the shadow shapes obtained by changing the light source direction around the vehicle 1 in increments of 10 degrees are stored. The generated shape of the shadow based on each light source direction and the shape of the shadow that appears in the histogram generation region are compared with each other to calculate the similarity between the shapes. The method for calculating the similarity is not the feature of this technique, and the description thereof is omitted.

The light source direction with which the calculated similarity indicates the maximum value that is greater than or equal to a predetermined threshold value is set as the current light source direction, and the current light source direction is inverted 180 degrees, and the obtained direction is set as the shadow direction. At this time, a shadow direction determination possible/impossible flag is set to indicate that the determination is possible. The flag, the current light source direction, and the shadow direction are outputted. In a case where each similarity of the shape of the shadow based on the light source direction is less than the predetermined threshold value, the shadow direction determination possible/impossible flag is set to indicate that the determination is impossible since the direction of the shadow cannot be estimated, and only the shadow direction determination possible/impossible flag is outputted.

Figure 22:
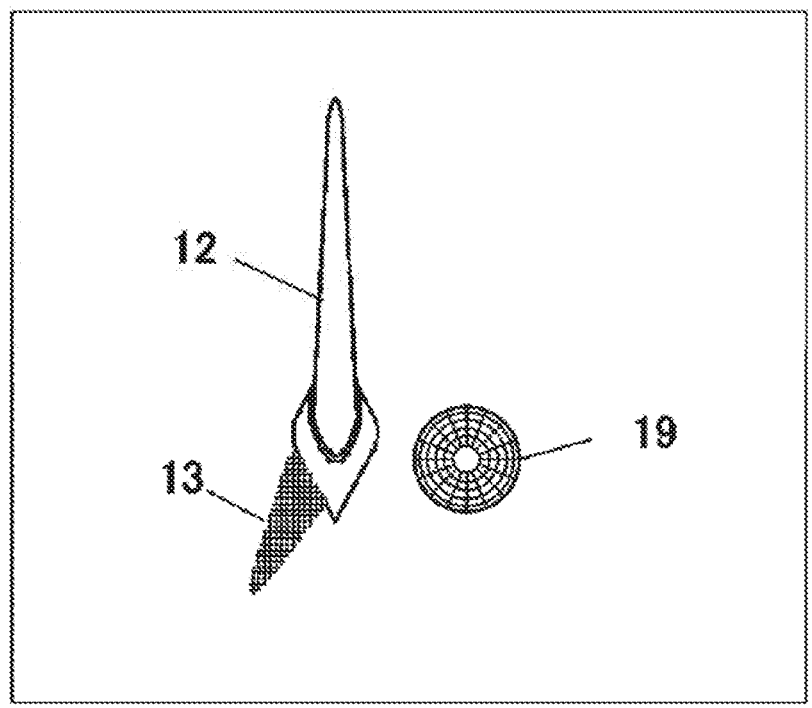
FIG. 22 illustrates an example of a partial transform image in the obstacle detection apparatus according to embodiment 3.

In FIG. 21, the flow of the process steps from step S320 to step S326 will be described by using an example where an obstacle is detected in the partial transform image as shown in FIG. 22. In FIG. 22, an in-sunlight road surface in sunshine, the pylon 12, the pylon shadow 13 which has a brightness value less than the in-sunlight road surface, and a manhole 19 are included.

Figure 23:
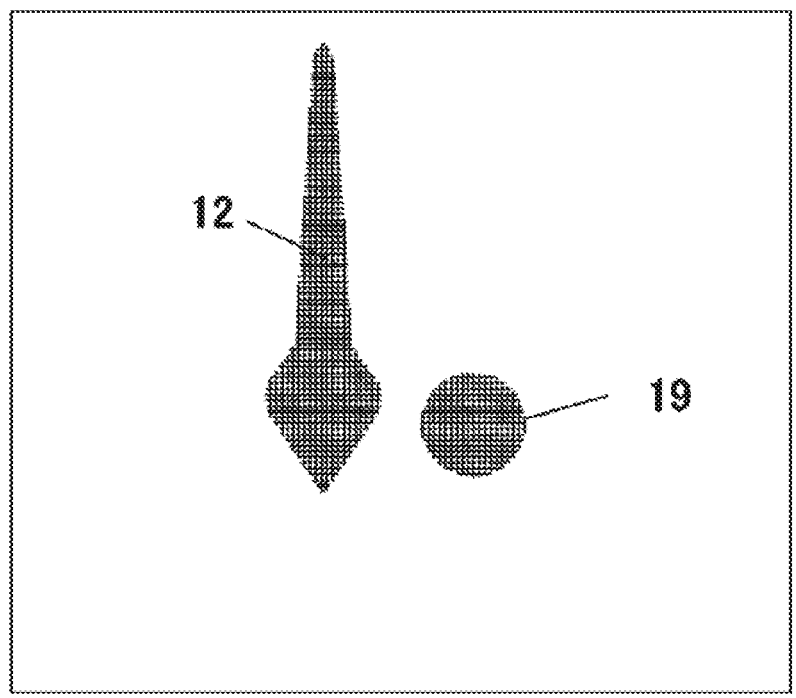
FIG. 23 illustrates an image in which a brightness value is 255 for the first region and the second region, and the brightness value is 0 for an obstacle region that is not included in the first region and the second region, in the partial transform image in the obstacle detection apparatus according to embodiment 3.
Figure 24:
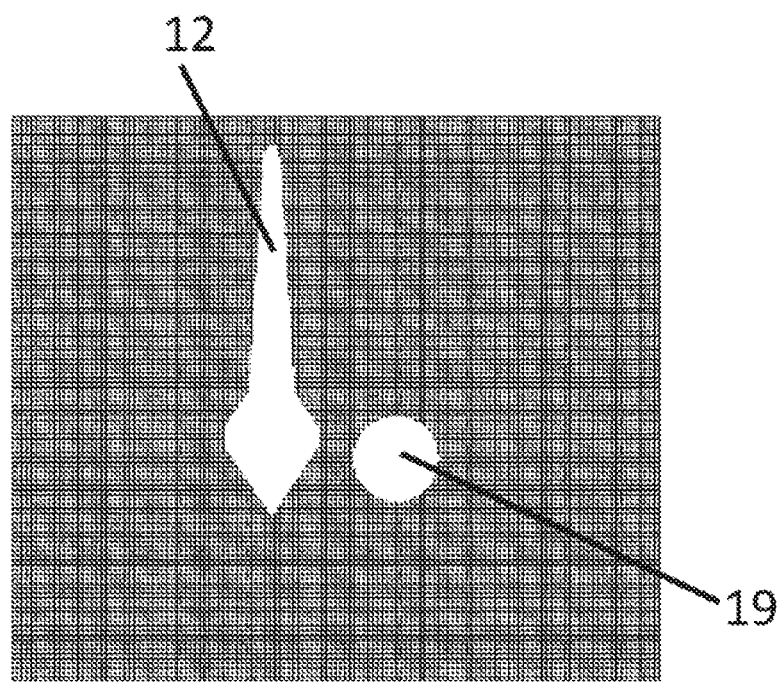
FIG. 24 illustrates an image in which a brightness value is 0 for the first region and the second region, and the brightness value is 255 for an obstacle region that is not included in a road surface region, in the partial transform image in the obstacle detection apparatus according to embodiment 3.

In FIG. 21, in step S320, the region inverting unit 216 shown in FIG. 20 inverts the first region extracted in step S113 and the second region extracted in step S114 to extract an obstacle region that is not included in the road surface region. Firstly, the road surface detection apparatus of embodiment 1 extracts the first region and the second region. Next, in the first region and the second region, the brightness value is set as 255 for pixels having a brightness value of 255, and the brightness value is set as 0 for the remaining pixels. Thus, the road surface region that is represented by the image shown in FIG. 23 is calculated. (In FIG. 23, the white portion corresponds to the in-sunlight road surface and the shadow road surface having the brightness value of 255, and the hatched portions correspond to the obstacle and the manhole 19 having the brightness value of 0.) In the road surface region, the pixels having the brightness value of 255 are inverted to pixels having the brightness value of 0 and the pixels having the brightness value of 0 are inverted to pixels having the brightness value of 255 to output an obstacle region that is represented by the image shown in FIG. 24. (In FIG. 24, the hatched portion corresponds to the road surface region having the brightness value of 0, and the white portion corresponds to an obstacle region that has the brightness value of 255 and that is not included in the road surface region.)

In FIG. 21, in step S321, whether the shadow direction determination possible/impossible flag outputted in step S319 indicates that the determination is possible or impossible is determined. In a case where the shadow direction determination possible/impossible flag indicates that the determination is possible, the shadow is determined to be present, and the height determination process for the obstacle is performed by using the shadow in step S322. However, in a case where the shadow direction determination possible/impossible flag indicates that the determination is impossible, the shadow direction cannot be determined. Therefore, step S322 is skipped and the process shifts to step S323.

In step S322, the obstacle position detection unit 220 shown in FIG. 20 determines the height of the obstacle region extracted in step S320 by using the second region extracted in step S114 and the shadow direction calculated in step S319. For example, an obstacle region which is not in contact with the second region in the shadow direction in the obstacle region is determined as an obstacle region having no height, in the obstacle region. Thereafter, a height determination image in FIG. 25, which is obtained by changing, to 0, the brightness value of the obstacle region determined to have no height in the image in FIG. 24 which represents the obstacle region, is outputted. (In FIG. 25, the hatched portion corresponds to the road surface region having the brightness value of 0 and the manhole 19 that is the obstacle region having no height, and the white portion corresponds to the obstacle region having the brightness value of 255.)

In FIG. 21, in step S323, the image storage unit 217 shown in FIG. 20 stores a plurality of frames of the composite transform images outputted in step S112, and outputs a predetermined number of preceding frames of the composite transform images, as the previous composite transform image. For example, the image storage unit 217 shown in FIG. 20 has a limited memory, and stores the composite transform images which are taken in units of 30 frames per second, transformed, and combined, and outputs the preceding five frames of the composite transform images as the previous composite transform image. In a case where the memory reaches the upper limit capacity, the image storage unit 217 deletes the earliest composite transform image, and stores a new composite transform image. In embodiment 3, the preceding five frames of the composite transform images are outputted. However, this number of frames may not be fixed, and may be changed according to a vehicle speed. For example, the number of frames may be increased for low vehicle speeds, and the number of frames may be reduced for high vehicle speeds.

In step S324, the differential image obstacle region extraction unit 218 shown in FIG. 20 calculates a difference in the composite transform image between the composite transform image generated in step S112 and the previous composite transform image stored in step S323, and outputs a region in which the difference in the composite transform image is greater than or equal to a predetermined threshold value, as the differential obstacle region in the composite transform image. In embodiment 3, an image as shown in FIG. 26 is outputted such that the brightness value is set as 255 for the region in which the difference is greater than or equal to the threshold value, and the brightness value is set as 0 for the region in which the difference is less than the threshold value.

Figure 27:
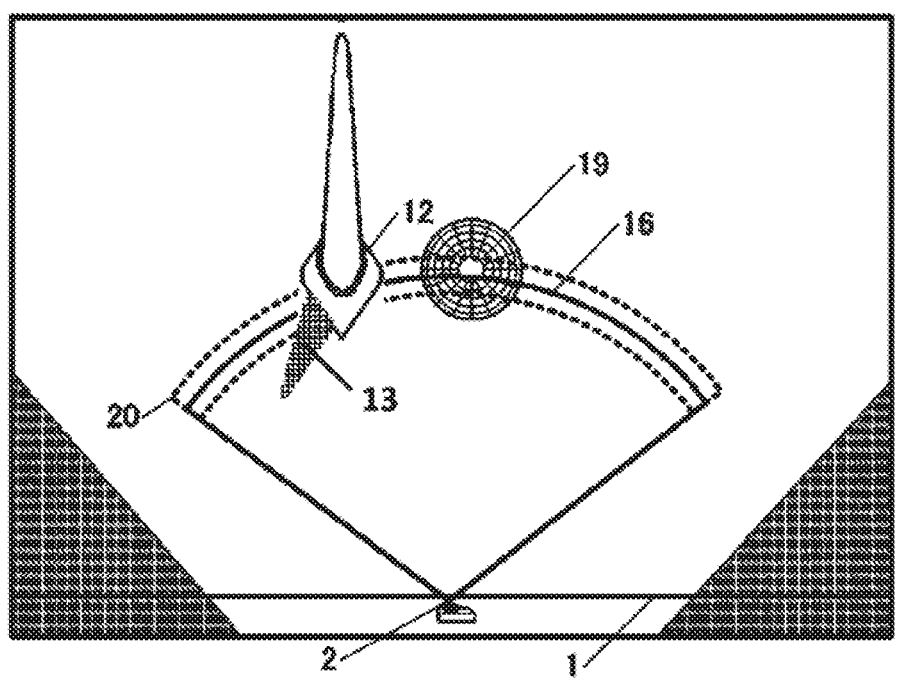
FIG. 27 illustrates an obstacle detection zone 20 indicated by dashed lines in the partial transform image in the obstacle detection apparatus according to embodiment 3.
Figure 28:
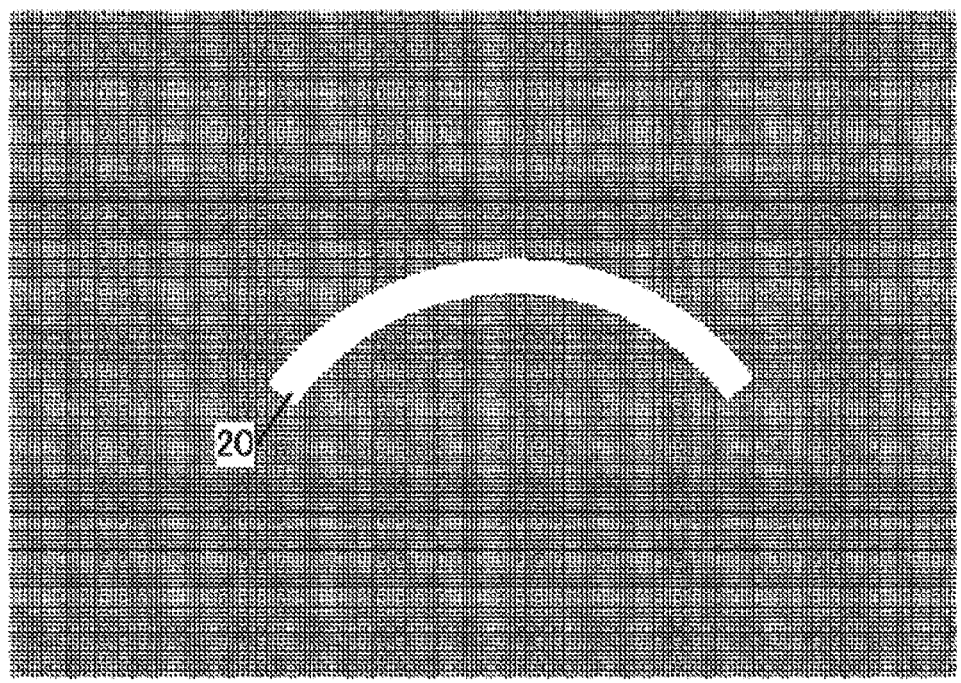
FIG. 28 illustrates an image in which a brightness value is 255 for the obstacle detection zone 20, and the brightness value is 0 for a region that is not included in the obstacle detection zone 20, in the partial transform image in the obstacle detection apparatus according to embodiment 3.

In step S325, the obstacle detection zone calculation unit 219 calculates an obstacle detection zone based on the obstacle distance obtained by the second obstacle distance detection unit, and outputs the coordinate thereof. A method for calculating the obstacle detection zone in embodiment 3 will be described with reference to FIG. 27. As described in embodiment 1, the obstacle detected by the sonar sensor 2 is located at a position on the arc 16 distant from the position of the sonar sensor 2 over the obstacle distance. An obstacle detection zone 20 is set by using the arc 16 such that a predetermined obstacle detection width is set, and an area obtained by adding and subtracting the obstacle detection width to and from the radius of the arc 16 is the obstacle detection zone 20. The obstacle detection width is a value obtained in consideration of, for example, an error in obstacle detection by the sonar sensor 2, and is, for example, about 30 cm. The obstacle detection zone 20 is represented as shown in FIG. 28, and the brightness value is 255 for the entire region of the obstacle detection zone 20, and the brightness value is 0 for the other regions. (In FIG. 28, the brightness value is 255 for the white portion corresponding to the obstacle detection zone, and the brightness value is 0 for the hatched portion corresponding to the other regions.)

Figure 25:
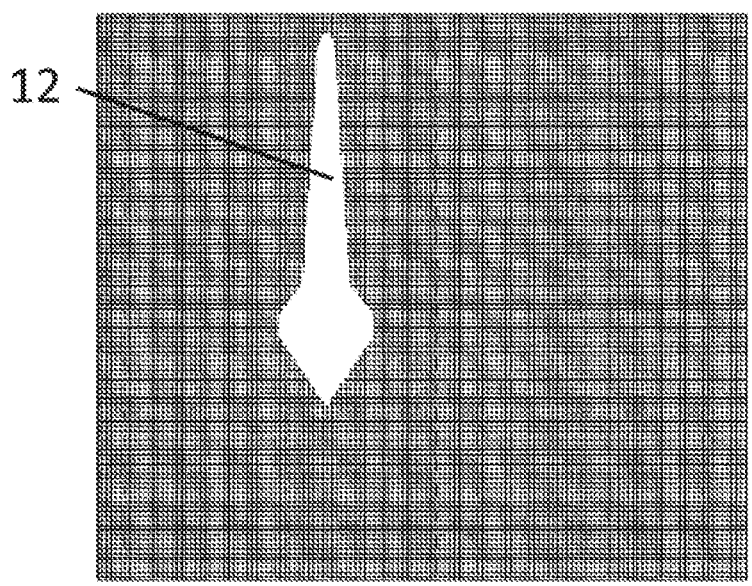
FIG. 25 illustrates an image in which a brightness value is 0 for the first region and an obstacle region having no height, and the brightness value is 255 for the other obstacle region, in the partial transform image in the obstacle detection apparatus according to embodiment 3.
Figure 26:
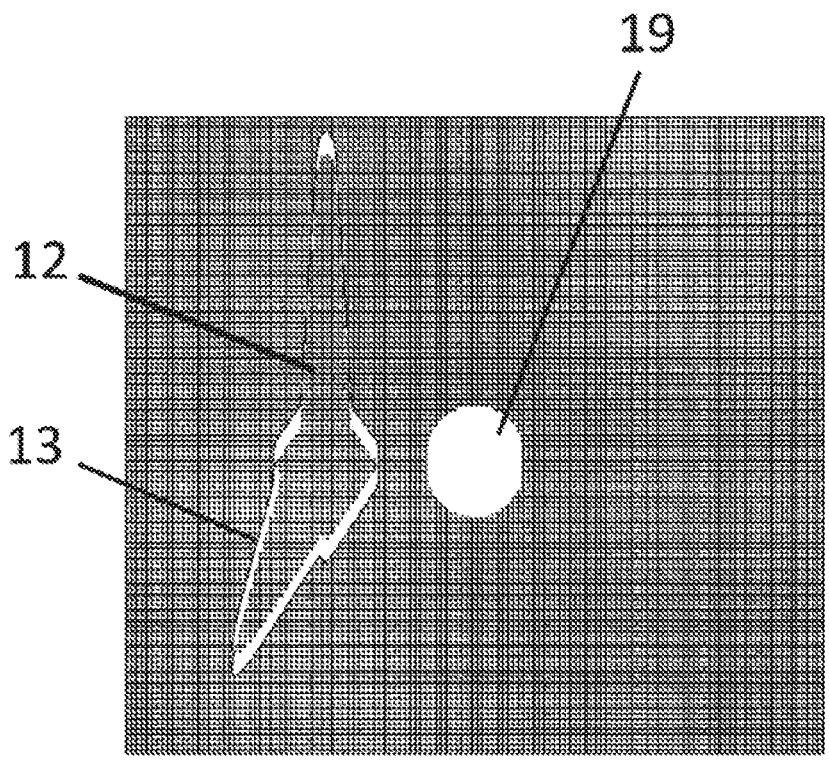
FIG. 26 illustrates an image in which a brightness value is 255 for a region in which a difference between a composite transform image and a previous composite transform image is greater than or equal to a threshold value, and the brightness value is 0 for a region in which the difference is less than the threshold value, in the obstacle detection apparatus according to embodiment 3.

In FIG. 21, in step S326, the obstacle position detection unit 220 shown in FIG. 20 detects, as the obstacle region in the composite transform image, a region in which at least two of the obstacle region in FIG. 25, the differential obstacle region in FIG. 26, and the obstacle detection zone 20 in FIG. 28 overlap each other, and calculates a coordinate of the obstacle region in the composite transform image as the obstacle position, and outputs the obstacle position and the result of the height determination in step S322 as obstacle position information.

Function and Effect of Embodiment 3

Thus, the obstacle detection apparatus of embodiment 3 combines, into the composite transform image, the partial transform images obtained by transformation of road surface images, of portions around the vehicle 1, which are obtained by the cameras 3, extracts the obstacle region from the composite transform image based on the first region and the second region outputted by the road surface detection apparatus of embodiment 1, further measures the obstacle distance between the vehicle 1 and the obstacle around the vehicle 1 by using the sonar sensor 2, outputs the obstacle detection zone 20 obtained from the obstacle distance, outputs the differential obstacle region, in the composite transform image, which is obtained from the difference in the composite transform image, and obtains an obstacle position by setting, as the obstacle region in the composite transform image, a region in which at least two of the obstacle region, the obstacle detection zone 20, and the differential obstacle region in the composite transform image overlap each other. Thus, the obstacle detection apparatus and the obstacle detection method having higher accuracy than conventional art can be provided.

In the obstacle detection apparatus of embodiment 3, even in a case where the second obstacle distance detection unit is damaged, a region in which the obstacle region extracted from the composite transform image based on the first region and the second region outputted by the road surface detection apparatus of embodiment 1 overlaps the differential obstacle region, in the composite transform image, which is obtained by the difference in the composite transform image is obtained as the obstacle region in the composite transform image, to obtain the obstacle position, thereby detecting the obstacle without problems.

In a case where the vehicle 1 is at stop, only a moving object around the vehicle 1 is detected and a stationary object cannot be detected for the differential obstacle region, in the composite transform image, obtained by the difference in the composite transform image. Therefore, in a case where the vehicle speed of the vehicle 1 is 0, or less than or equal to a predetermined threshold value, the obstacle detection apparatus extracts, as an obstacle region in the composite transform image, the obstacle region which is extracted based on the road surface detection apparatus of embodiment 1, and obtains the obstacle position, thereby detecting the obstacle.

Whether the detected obstacle region represents a pattern on a road surface or an obstacle having a height can be determined by the shadow direction determination unit. Therefore, the pattern of the road surface can be prevented from being erroneously detected as an obstacle.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 vehicle
2 sonar sensor
3 camera
4 communication line
5 camera wiring
6 sonar sensor wiring
7 sonar controller
8 surroundings monitoring camera controller
9 other sensors
10 calculation device
11 road surface detection device
12 pylon
13 pylon shadow
14 white line
15 shadow of vehicle
16 arc
17 point of intersection of arcs
19 manhole
20 obstacle detection zone
200 imaging unit
201 obstacle distance detection unit
202 vehicle signal detection unit
203 image transform unit
204 histogram generation region extraction unit
205 histogram generation region combining unit
206 histogram calculation unit
207 histogram separation unit
208 transform image combining unit
209 first region extraction unit
210 second region extraction unit
211 display image generation unit
212 display image second region extraction unit
213 color substitution unit
214 image display unit
215 shadow direction determination unit
216 region inverting unit
217 image storage unit
218 differential image obstacle region extraction unit
219 obstacle detection zone calculation unit
220 obstacle position detection unit

The invention claimed is:

1. A road surface detection apparatus comprising:
an imaging device disposed in a vehicle which obtains a road surface image of a portion around the vehicle, and outputs a plurality of partial road surface images each of which represents a part of the road surface image;
an image transformer to transform the plurality of partial road surface image to a plurality of partial transform images by transforming a road surface region viewed from the image device mounted on the vehicle to a road surface region that provides a bird's eye view from directly above the road surface region;

a transform image combiner to output a composite transform image of the vehicle based on the plurality of partial transform images;
a histogram generation region extraction processor which receives input of the plurality of partial road surface images, and extracts a predetermined region of the plurality of partial transform images as a plurality of histogram generation regions;
a histogram generation region combiner which combines the plurality of histogram generation regions and outputs the combined region as a histogram generation composite region;
a histogram calculator to calculate a histogram based on the histogram generation composite region;
a histogram separator to separate the histogram into a first histogram and a second histogram and output the first and the second histograms;
a first region extraction processor which extracts a first region from the first histogram and the composite transform image; and
a second region extraction processor which extracts a second region from the second histogram and the composite transform image, wherein
the histogram separator separates the histogram such that an element including a first peak value is the first histogram, and an element including a second peak value is the second histogram.

2. The road surface detection apparatus according to claim 1, wherein the histogram separator outputs only the first histogram without outputting the second histogram when the second peak value of the histogram is less than a predetermined threshold value.

3. The road surface detection apparatus according to claim 1, comprising an obstacle distance detector to detect an obstacle distance in a range of the partial road surface image, wherein
the histogram generation region extraction processor varies the histogram generation region according to the obstacle distance.

4. The road surface detection apparatus according to claim 1, comprising a vehicle signal detector to detect a vehicle signal, wherein
the histogram generation region combiner changes a combination ratio for a plurality of the histogram generation regions according to the vehicle signal.

5. An obstacle detection apparatus using a road surface detection apparatus, the obstacle detection apparatus comprising:
a region inverter to extract, as an obstacle region, a region that is not included in the first region and the second region in the composite transform image or the partial road surface image in the road surface detection apparatus according to claim 1; and
an obstacle position detector to calculate an obstacle position with respect to the vehicle based on the obstacle region, and output the obstacle position as obstacle position information.

6. The obstacle detection apparatus, using the road surface detection apparatus, according to claim 5, the obstacle detection apparatus comprising:
an image storage unit for storing the composite transform image;
a differential image obstacle region extraction processor which calculates a difference between the composite transform image stored in the image storage unit and a previous composite transform image that is previously stored, and extracts, as a differential obstacle region in the composite transform image, a region in which deviation is greater than or equal to a predetermined value in the difference in the composite transform image; and
an obstacle position detector to output, as the obstacle position, a portion in which the differential obstacle region overlaps the obstacle region.

7. The obstacle detection apparatus, using the road surface detection apparatus, according to claim 5, the obstacle detection apparatus comprising:
an obstacle distance detector to detect an obstacle distance;
an obstacle detection zone calculator which calculates, as an obstacle detection zone, a region in which an arc, having a radius that is the obstacle distance detected by the obstacle distance detector, is widened in a radial direction and a circumferential direction so as to have a constant width; and
an obstacle position detector to detect a position of an obstacle based on the obstacle detection zone and the obstacle region.

8. The obstacle detection apparatus, using the road surface detection apparatus, according to claim 6, the obstacle detection apparatus comprising:
an obstacle distance detector to detect an obstacle distance;
an obstacle detection zone calculator which calculates, as an obstacle detection zone, a region in which an arc, having a radius that is the obstacle distance detected by the obstacle distance detector, is widened in a radial direction and a circumferential direction so as to have a constant width; and
an obstacle position detector to detect, as a position of an obstacle, a portion in which at least two of the obstacle detection zone, the differential obstacle region, and the obstacle region overlap each other.

9. The obstacle detection apparatus, using the road surface detection apparatus, according to claim 5, the obstacle detection apparatus comprising a shadow direction determinator which outputs a light source direction around the vehicle, a shadow direction opposite to the light source direction, and a result of determining whether shadow direction determination is possible or impossible, wherein
in a case where the shadow direction determination is possible, an obstacle region which is not in contact with the second region in the shadow direction in the obstacle region is determined as an obstacle having no height.

10. A road surface detection apparatus comprising:
an imaging device disposed in a vehicle which obtains, as a partial road surface image, a road surface image of a portion around the vehicle;
an image transformer to transform the partial road surface image by transforming a road surface region viewed from the image device mounted on the vehicle to a road surface region that provides a bird's eye view from directly above the road surface region;
a histogram generation region extraction processor which extracts a predetermined region as a histogram generation region based on the transformed partial road surface image;
a histogram calculator to calculate a histogram in the histogram generation region extracted by the histogram generation region extraction processor;
a histogram separator to separate the calculated histogram into a first histogram representing an in-sunlight road surface and a second histogram representing a shadow road surface, according to a peak value;

a first region extraction processor which extracts a first region based on the first histogram and the transformed partial road surface image; and a second region extraction processor which extracts a second region based on the second histogram and the transformed partial road surface image.

11. The road surface detection apparatus according to claim 10, comprising a histogram generation region combiner which combines a plurality of the histogram generation regions extracted by the histogram generation region extraction processor based on the transformed partial road surface image, to allow the histogram calculator to calculate the histogram.

12. An image display apparatus using a road surface detection apparatus, the image display apparatus comprising:

an imaging device disposed in a vehicle which obtains a road surface image of a portion around the vehicle, and outputs a plurality of partial road surface images each of which represents a part of the road surface image;

a histogram generation region extraction processor which receives input of the plurality of partial road surface images, and extracts a predetermined region of the partial road surface images as a plurality of histogram generation regions;

a histogram generation region combiner which combines the plurality of histogram generation regions and outputs the combined region as a histogram generation composite region;

a histogram calculator to calculate a histogram based on the histogram generation composite region;

a histogram separator to separate the histogram into a first histogram and a second histogram and output the first and the second histograms;

a first region extraction processor which extracts a first region from the first histogram and the partial road surface images; and a second region extraction processor which extracts a second region from the second histogram and the partial road surface images, wherein the histogram separator separates the histogram such that an element including a first peak value is the first histogram, and an element including a second peak value is the second histogram, a display image generator to generate a display image by using the imaging device;

a display image second region extraction processor which extracts, from the display image, a display image second region corresponding to the second region in the road surface detection apparatus;

a color substitutor to perform color substitution for a color of the display image second region based on the first histogram by using the display image, the display image second region, and the first histogram outputted by the road surface detection apparatus, and outputting an image obtained by the color substitution as a color substitution display image; and an image display unit for displaying the color substitution display image.

13. A road surface detection method comprising:

a first step of obtaining a road surface image of a portion around a vehicle, and outputting a plurality of partial road surface images each representing a part of the road surface image;

a second step of transform the plurality of partial road surface image to a plurality of partial transform images by transforming a road surface region viewed from an image device mounted on the vehicle to a road surface region that provides a bird's eye view from directly above the road surface region;

a third step of extracting a predetermined region of the partial road surface images, as a plurality of histogram generation regions, based on the plurality of partial transform images, combining the plurality of the histogram generation regions having been extracted, and outputting the combined region as a histogram generation composite region;

a fourth step of calculating a histogram based on the histogram generation composite region;

a fifth step of separating the histogram into a first histogram and a second histogram, and outputting the first and the second histograms;

a sixth step of extracting a first region based on the first histogram and the partial transform images; and a sixth seventh step of extracting a second region based on the second histogram and the partial transform images, wherein the histogram is outputted such that an element including a first peak value is the first histogram and an element including a second peak value is the second histogram, in the fifth step.

14. An image display method using the road surface detection method according to claim 13, wherein color substitution in the second region is performed based on the first histogram, to output a display image.

15. An obstacle detection method using a road surface detection method, the obstacle detection method comprising a step of detecting a position of an obstacle by using the road surface detection method according to claim 13.

* * * * *